(12) United States Patent
Shaked

(10) Patent No.: US 12,412,991 B2
(45) Date of Patent: Sep. 9, 2025

(54) TECHNIQUES FOR CONTINUOUS BEAM SCANNING FOR INTEGRATED LENS ANTENNAS

(71) Applicant: QUALCOMM Incorporated, San Diego, CA (US)

(72) Inventor: Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/181,287

(22) Filed: Mar. 9, 2023

(65) Prior Publication Data

US 2024/0305008 A1     Sep. 12, 2024

(51) Int. Cl.
*H01Q 15/02* (2006.01)
*H04B 7/0456* (2017.01)
*H04B 7/06* (2006.01)
*H04B 7/08* (2006.01)

(52) U.S. Cl.
CPC ........... *H01Q 15/02* (2013.01); *H04B 7/0695* (2013.01); *H04B 7/088* (2013.01)

(58) Field of Classification Search
CPC ...... H01Q 15/02; H04B 7/0695; H04B 7/088; H04B 7/0456; H04B 7/06952
See application file for complete search history.

(56) References Cited

U.S. PATENT DOCUMENTS

| | | | |
|---|---|---|---|
| 3,835,469 A | 9/1974 | Chen et al. | |
| 11,929,798 B2 * | 3/2024 | Chavez | H04B 7/086 |
| 2017/0156097 A1 * | 6/2017 | Weber | H04B 17/382 |
| 2019/0182796 A1 * | 6/2019 | Wang | G01S 13/765 |
| 2019/0182798 A1 | 6/2019 | Beale et al. | |
| 2021/0160714 A1 * | 5/2021 | Shi | H04W 28/10 |
| 2021/0376894 A1 * | 12/2021 | Cha | H04B 7/0695 |

(Continued)

FOREIGN PATENT DOCUMENTS

| CA | 2938744 C | 1/2021 |
|---|---|---|
| WO | WO-2016122111 A1 | 8/2016 |

(Continued)

OTHER PUBLICATIONS

International Search Report and Written Opinion—PCT/US2024/018041—ISA/EPO—Jul. 4, 2024.

*Primary Examiner* — Harry H Kim
(74) *Attorney, Agent, or Firm* — Holland & Hart LLP

(57) ABSTRACT

Methods, systems, and devices for wireless communications are described. A user equipment (UE) may transmit a first measurement report to a network entity which includes a set of beam measurements corresponding to a set of beams of a beam codebook. The network entity may then perform a set of weighted measurement calculations to determine a first serving beam that is different from each of the set of beams of the existing beam codebook. The network entity may then transmit a first serving beam indication that instructs the UE to begin monitoring the first serving beam. The UE may then transmit a second measurement report to the network entity that includes a second set of beam measurements which includes measurements for the first serving beam. The network entity and the UE may then communicate via the first serving beam based on the measurements for the first serving beam satisfying a threshold.

30 Claims, 15 Drawing Sheets

(56) References Cited

U.S. PATENT DOCUMENTS

| | | | |
|---|---|---|---|
| 2022/0070834 A1* | 3/2022 | Raghavan | H04B 7/086 |
| 2022/0141675 A1 | 5/2022 | Landis et al. | |
| 2022/0338202 A1* | 10/2022 | Kim | H04B 7/06 |
| 2023/0057661 A1 | 2/2023 | Awoniyi-Oteri et al. | |
| 2024/0305341 A1 | 9/2024 | Shaked | |

FOREIGN PATENT DOCUMENTS

| | | |
|---|---|---|
| WO | WO-2022119487 A1 | 6/2022 |
| WO | WO-2022235321 A1 | 11/2022 |
| WO | WO-2024069909 A1 | 4/2024 |

\* cited by examiner

TECHNIQUES FOR CONTINUOUS BEAM SCANNING FOR INTEGRATED LENS ANTENNAS

FIELD OF TECHNOLOGY

The following relates to wireless communications, including techniques for continuous beam scanning for integrated lens antennas.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for continuous beam scanning for integrated lens antennas. For example, the described techniques may support the use of a lens antenna, or other antenna capable of continuous beam scanning, to generate directional (e.g., narrow) beams for performing continuous beam tracking. A network entity may generate a set of discrete beams from a beam codebook, and may transmit the beams to a user equipment (UE), which may perform measurements on the set of beams. The UE may send a measurement report to the network entity including measurements corresponding to the set of discrete beams. Using the received measurements, the network entity may calculate the boresight angle of an new beam (e.g., a beam that may exceed a threshold receive power at the UE (e.g., maximize a received power at the UE)) based on a weighted combination of the discrete beams, and one or more refinement (e.g., optimization) procedures. The network entity may then add this new beam to a beam codebook for the UE, and may instruct the UE to begin using the new beam via a serving beam indication. The UE may then continue to perform beam measurements on beams of the beam codebook including the serving beam, and may send measurement reports to the network entity. The network entity may then use the ongoing measurement reporting from the UE to determine whether to keep or remove the new beam from the beam codebook. For example, the network entity may determine, based on beam measurements, that the quality or received power of the new beam has fallen below a threshold, or that the new beam has been in use for a time duration that exceeds a threshold. The network entity may then remove the beam from the beam codebook and may calculate another new beam for the UE to use for subsequent communications.

A method for wireless communication at a network entity is described. The method may include transmitting a set of synchronization signals via a set of multiple beams of a beam codebook, receiving a first measurement report indicating a first set of beam measurements corresponding to the set of multiple beams of the beam codebook based on the set of synchronization signals, transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report, receiving a second measurement report indicating a second set of beam measurements corresponding to the set of multiple beams and indicating at least one beam measurement associated with the first serving beam, and communicating one or more messages via the first serving beam based on the at least one beam measurement associated with the first serving beam satisfying a threshold.

An apparatus for wireless communication at a network entity is described. The apparatus may include a processor, memory coupled with the processor, and instructions stored in the memory. The instructions may be executable by the processor to cause the apparatus to transmit a set of synchronization signals via a set of multiple beams of a beam codebook, receive a first measurement report indicating a first set of beam measurements corresponding to the set of multiple beams of the beam codebook based on the set of synchronization signals, transmit a first serving beam indication including instructions to monitor a first serving beam that is different from each of the set of multiple beams of the beam codebook used for transmission of the set of synchronization signals, where the first serving beam is based on the first set of beam measurements indicated by the first measurement report, receive a second measurement report indicating a second set of beam measurements corresponding to the set of multiple beams and indicating at least one beam measurement associated with the first serving beam, and communicate one or more messages via the first serving beam based on the at least one beam measurement associated with the first serving beam satisfying a threshold.

Another apparatus for wireless communication at a network entity is described. The apparatus may include means for transmitting a set of synchronization signals via a set of multiple beams of a beam codebook, means for receiving a first measurement report indicating a first set of beam measurements corresponding to the set of multiple beams of the beam codebook based on the set of synchronization signals, means for transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report, means for receiving a second measurement report indicating a second set of beam measurements corresponding to the set of multiple beams and indicating at least one beam measurement associated with the first serving beam, and means for communicating one or more messages via the first serving beam based on the at least one beam measurement associated with the first serving beam satisfying a threshold.

A non-transitory computer-readable medium storing code for wireless communication at a network entity is described. The code may include instructions executable by a processor to transmit a set of synchronization signals via a set of multiple beams of a beam codebook, receive a first measurement report indicating a first set of beam measurements corresponding to the set of multiple beams of the beam codebook based on the set of synchronization signals, transmit a first serving beam indication including instructions to monitor a first serving beam that is different from each of the set of multiple beams of the beam codebook used for transmission of the set of synchronization signals, where the first serving beam is based on the first set of beam measurements indicated by the first measurement report, receive a second measurement report indicating a second set of beam measurements corresponding to the set of multiple beams and indicating at least one beam measurement associated with the first serving beam, and communicate one or more messages via the first serving beam based on the at least one beam measurement associated with the first serving beam satisfying a threshold.

Some examples of the method, apparatuses, and non-transitory computer-readable medium described herein may further include operations, features, means, or instructions for performing a weighted sum of the first set of beam measurements corresponding to each of the set of multiple beams of the beam codebook, where the first serving beam may be associated with a beam direction that may be based on the weighted sum.

Some examples of the method, apparatuses, and non-transitory computer-readable medium described herein may further include operations, features, means, or instructions for generating, based on the first set of beam measurements, a beam index associated with the first serving beam, the beam index different from a set of beam indices for the set of multiple beams of the beam codebook and transmitting an indication of the beam codebook including the beam index associated with the first serving beam.

In some examples of the method, apparatuses, and non-transitory computer-readable medium described herein, receiving the second measurement report indicating the second set of beam measurements may include operations, features, means, or instructions for receiving one or more respective received power measurements for each of the set of multiple beams of the beam codebook and the first serving beam.

Some examples of the method, apparatuses, and non-transitory computer-readable medium described herein may further include operations, features, means, or instructions for generating, for the beam codebook, a beam index associated with a second serving beam based on removal of the first serving beam from the beam codebook and transmitting a second serving beam indication including instructions to monitor the second serving beam that may be different from each of the set of multiple beams of the beam codebook and the first serving beam.

Some examples of the method, apparatuses, and non-transitory computer-readable medium described herein may further include operations, features, means, or instructions for generating the first serving beam by routing an input signal to at least two antenna elements of the network entity and transmitting, using the at least two antenna elements, the first serving beam in a direction that may be based on the first set of beam measurements of the first measurement report.

Some examples of the method, apparatuses, and non-transitory computer-readable medium described herein may further include operations, features, means, or instructions for splitting the input signal into two input signals having different respective input powers at each antenna element of the at least two antenna elements.

Some examples of the method, apparatuses, and non-transitory computer-readable medium described herein may further include operations, features, means, or instructions for applying one or more beam weights to each antenna element of the at least two antenna elements.

Some examples of the method, apparatuses, and non-transitory computer-readable medium described herein may further include operations, features, means, or instructions for generating the first serving beam based on one or more beam coefficients, an input signal at the network entity, a radiation pattern of each of the set of multiple beams, an angle of one or more sidelobes associated with the radiation pattern, or any combination thereof.

Some examples of the method, apparatuses, and non-transitory computer-readable medium described herein may further include operations, features, means, or instructions for applying a selection algorithm to a set of multiple beam weight coefficients included in the first set of beam measurements to determine a set of beam weight coefficients associated with the first serving beam and transmitting the first serving beam according to a signal energy that may be based on the set of beam weight coefficients.

In some examples of the method, apparatuses, and non-transitory computer-readable medium described herein, the selection algorithm includes a gradient decent algorithm.

Some examples of the method, apparatuses, and non-transitory computer-readable medium described herein may further include operations, features, means, or instructions for determining a direction of the first serving beam based on a machine learning model, a parabolic interpolation of the first set of beam measurements, a high order interpolation of the first set of beam measurements, one or more optimization procedures, or any combination thereof.

In some examples of the method, apparatuses, and non-transitory computer-readable medium described herein, the threshold includes a receive power threshold, a time duration threshold, a beam selection threshold, or any combination thereof.

A method for wireless communication at a UE is described. The method may include receiving a set of synchronization signals via a set of multiple beams of a beam codebook, transmitting a first measurement report including a first set of beam measurements corresponding to the set of multiple beams of the beam codebook based on the set of synchronization signals, receiving a first serving beam indication including instructions to monitor a first serving beam that is different from each of the set of multiple beams of the beam codebook used for transmission of the set of synchronization signals, where the first serving beam is based on the first set of beam measurements indicated by the first measurement report, transmitting a second measurement report indicating a second set of beam measurements corresponding to the set of multiple beams and at least one beam measurement associated with the first serving beam, and communicating one or more messages via the first serving beam based on the at least one beam measurement associated with the first serving beam satisfying a threshold.

An apparatus for wireless communication at a UE is described. The apparatus may include a processor, memory coupled with the processor, and instructions stored in the memory. The instructions may be executable by the processor to cause the apparatus to receive a set of synchronization signals via a set of multiple beams of a beam codebook, transmit a first measurement report including a first set of beam measurements corresponding to the set of multiple beams of the beam codebook based on the set of synchronization signals, receive a first serving beam indication including instructions to monitor a first serving beam that is different from each of the set of multiple beams of the beam codebook used for transmission of the set of synchronization signals, where the first serving beam is based on the first set of beam measurements indicated by the first measurement report, transmit a second measurement report indicating a second set of beam measurements corresponding to the set of multiple beams and at least one beam measurement associated with the first serving beam, and communicate one or more messages via the first serving beam based on the at least one beam measurement associated with the first serving beam satisfying a threshold.

Another apparatus for wireless communication at a UE is described. The apparatus may include means for receiving a set of synchronization signals via a set of multiple beams of a beam codebook, means for transmitting a first measurement report including a first set of beam measurements corresponding to the set of multiple beams of the beam codebook based on the set of synchronization signals, means for receiving a first serving beam indication including instructions to monitor a first serving beam that is different from each of the set of multiple beams of the beam codebook used for transmission of the set of synchronization signals, where the first serving beam is based on the first set of beam measurements indicated by the first measurement report, means for transmitting a second measurement report indicating a second set of beam measurements corresponding to the set of multiple beams and at least one beam measurement associated with the first serving beam, and means for communicating one or more messages via the first serving beam based on the at least one beam measurement associated with the first serving beam satisfying a threshold.

A non-transitory computer-readable medium storing code for wireless communication at a UE is described. The code may include instructions executable by a processor to receive a set of synchronization signals via a set of multiple beams of a beam codebook, transmit a first measurement report including a first set of beam measurements corresponding to the set of multiple beams of the beam codebook based on the set of synchronization signals, receive a first serving beam indication including instructions to monitor a first serving beam that is different from each of the set of multiple beams of the beam codebook used for transmission of the set of synchronization signals, where the first serving beam is based on the first set of beam measurements indicated by the first measurement report, transmit a second measurement report indicating a second set of beam measurements corresponding to the set of multiple beams and at least one beam measurement associated with the first serving beam, and communicate one or more messages via the first serving beam based on the at least one beam measurement associated with the first serving beam satisfying a threshold.

Some examples of the method, apparatuses, and non-transitory computer-readable medium described herein may further include operations, features, means, or instructions for receiving the first serving beam that may be based on a weighted sum of the first set of beam measurements corresponding to each of the set of multiple beams of the beam codebook.

In some examples of the method, apparatuses, and non-transitory computer-readable medium described herein, receiving the first serving beam indication may include operations, features, means, or instructions for receiving an indication of the beam codebook including a beam index associated with the first serving beam based on the first set of beam measurements, the beam index different from a set of beam indices for the set of multiple beams of the beam codebook.

In some examples of the method, apparatuses, and non-transitory computer-readable medium described herein, transmitting the second measurement report indicating the second set of beam measurements may include operations, features, means, or instructions for transmitting one or more respective received power measurements for each of the set of multiple beams of the beam codebook and the first serving beam.

Some examples of the method, apparatuses, and non-transitory computer-readable medium described herein may further include operations, features, means, or instructions for receiving an indication of a beam index associated with a second serving beam that may be different from the first serving beam based on the first serving beam failing to satisfy the threshold and receiving a second serving beam indication including instructions to monitor the second serving beam that may be different from each of the set of multiple beams of the beam codebook and the first serving beam.

In some examples of the method, apparatuses, and non-transitory computer-readable medium described herein, the threshold includes a receive power threshold, a time duration threshold, a beam selection threshold, or any combination thereof.

DETAILED DESCRIPTION

Figure 1:
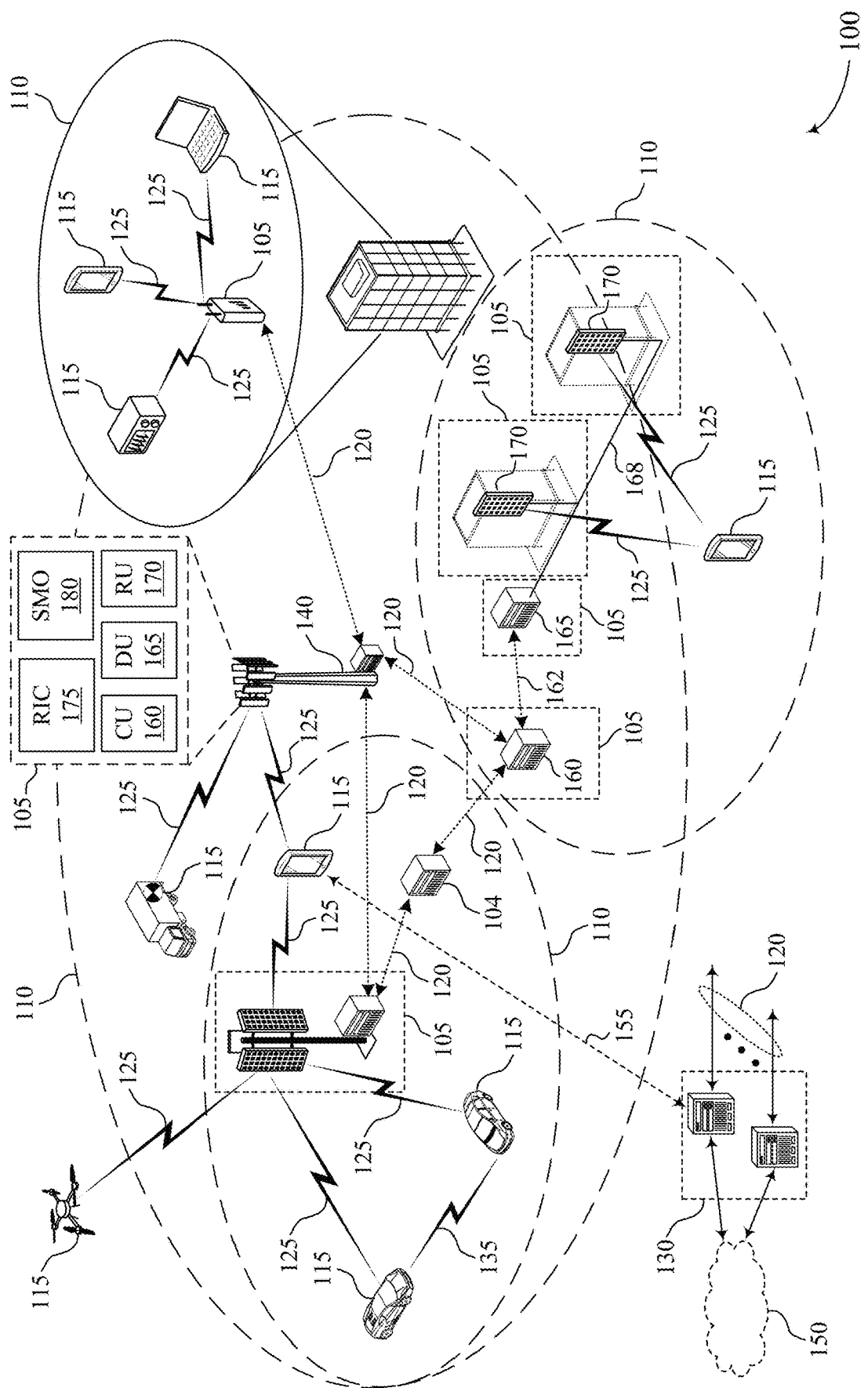
FIGS. 1 and 2 shows examples of wireless communications systems that support techniques for continuous beam scanning for integrated lens antennas in accordance with one or more aspects of the present disclosure.

Some advanced wireless communications systems that operate using ultra-high frequency communications (such as 6th Generation (6G) sub-teraHertz (sub-THz) communications) may implement wide bandwidths and relatively high carrier frequencies to support high system throughput, low latency, high traffic volume density, and increased spectral energy relative to systems operating at relatively lower frequencies. To compensate for increased path loss due to the high carrier frequency, wireless devices may increase gain using narrow beams generated using various different beamforming techniques. One technique, for example, may employ the use of a lens antenna to generate directional beams with high accuracy and efficiently across a range of beam directions (e.g., analog beam sweeping). In some cases, a lens antenna may generate a pre-defined grid of beams using a set of radiating elements behind the lens, where a beam corresponds to one element of an array whose direction is based on a focus of the lens. In some implementations, however, the beams generated by the lens antenna may be so narrow that even relatively small adjustments or movements of the receiver (such as a user equipment (UE)) may cause power losses and quality of service (QoS) degradation. Thus, a network entity operating using the lens antenna may implement various techniques to allow for more continuous beam tracking and increased coverage and beam steering accuracy.

In some implementations, the lens antenna capability may be extended from discrete beam scanning to continuous (e.g., "analog") beam scanning. More specifically, a UE may measure the received power of various discrete beams sent by the network entity, and the UE may send a measurement report to the network entity which includes a set of measurements for the discrete beams. Using the received measurements, the network entity may then calculate the boresight angle of a new beam (e.g., a beam that would maximize the received power at the UE) based on a weighted combination of the discrete beams, and one or more optimization or refinement procedures. The network entity may then temporarily add this new beam to a beam codebook for the UE, and may instruct the UE to begin using the new beam as a serving beam. The network entity may then generate a beam via more than one antenna elements that are activated simultaneously to form a beam in the direction of the UE and transmitted via the lens antenna. The UE may then continue to perform beam measurements on beams of the beam codebook including the serving beam, and may send measurement reports to the network entity.

The network entity may use the ongoing measurement reporting from the UE to determine whether to keep or remove the new beam from the beam codebook. For example, the network entity may determine, based on beam measurements, that the quality or received power of the new beam has fallen below a threshold, or that the new beam has been in use for a time duration that exceeds a threshold. The network entity may then remove the beam from the beam codebook and may calculate a new optimal beam for the UE to use. For example, the network entity may use beam measurements provided by the UE to perform an optimization procedure to find an optimized beam direction to transmit the new optimal beam.

Aspects of the disclosure are initially described in the context of wireless communications systems. Aspects of the disclosure are further illustrated by and described with reference to a lens antenna apparatus, a process flow, various apparatus diagrams, system diagrams, and flowcharts that relate to techniques for continuous beam scanning for integrated lens antennas.

FIG. 1 shows an example of a wireless communications system 100 that supports techniques for continuous beam scanning for integrated lens antennas in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for continuous beam scanning for integrated lens antennas as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Some advanced wireless communications systems that operate using ultra-high frequency communications (such as 6G sub-THz communications) may experience increased path loss due to the high carrier frequency. To increase gain, wireless devices may use narrow beams generated using various different beamforming techniques. One technique, for example, may employ the use of a lens antenna (e.g., at a network entity 105) to generate directional narrow beams with high accuracy. A lens antenna may generate a predefined grid of beams using a set of radiating elements behind the lens, where a beam corresponds to one element of an array whose direction can be determined based on lens focus. In some implementations, however, the beams generated by the lens antenna may be so narrow that even relatively small adjustments or movements of a receiving UE 115 can cause significant power losses and QoS degradation. Thus, a network entity 105 operating using the lens antenna may implement various techniques to allow for more continuous beam tracking and increased coverage.

A UE 115 may measure the received power of various discrete beams sent by the network entity 105, and the UE 115 may send a measurement report to the network entity 105 which includes a set of measurements for the discrete beams. Using the received measurements, the network entity 105 may then calculate the boresight angle of an new beam (e.g., a beam that would maximize the received power at the UE 115) based on a weighted combination of the discrete beams, and one or more optimization procedures. The network entity 105 may then temporarily add this new beam to a beam codebook for the UE 115, and may instruct the UE 115 to begin using the new beam as a serving beam. The UE 115 may then continue to perform beam measurements on beams of the beam codebook including the serving beam, and may send measurement reports to the network entity 105.

The network entity 105 may use the ongoing measurement reporting from the UE 115 to determine whether to keep or remove the new beam from the beam codebook. For example, the network entity 105 may determine, based on beam measurements, that the quality or received power of the new beam has fallen below a threshold, or that the new beam has been in use for a time duration that exceeds a threshold. The network entity 105 may then remove the beam from the beam codebook and may calculate a new optimal beam for the UE 115 to use.

Figure 2:
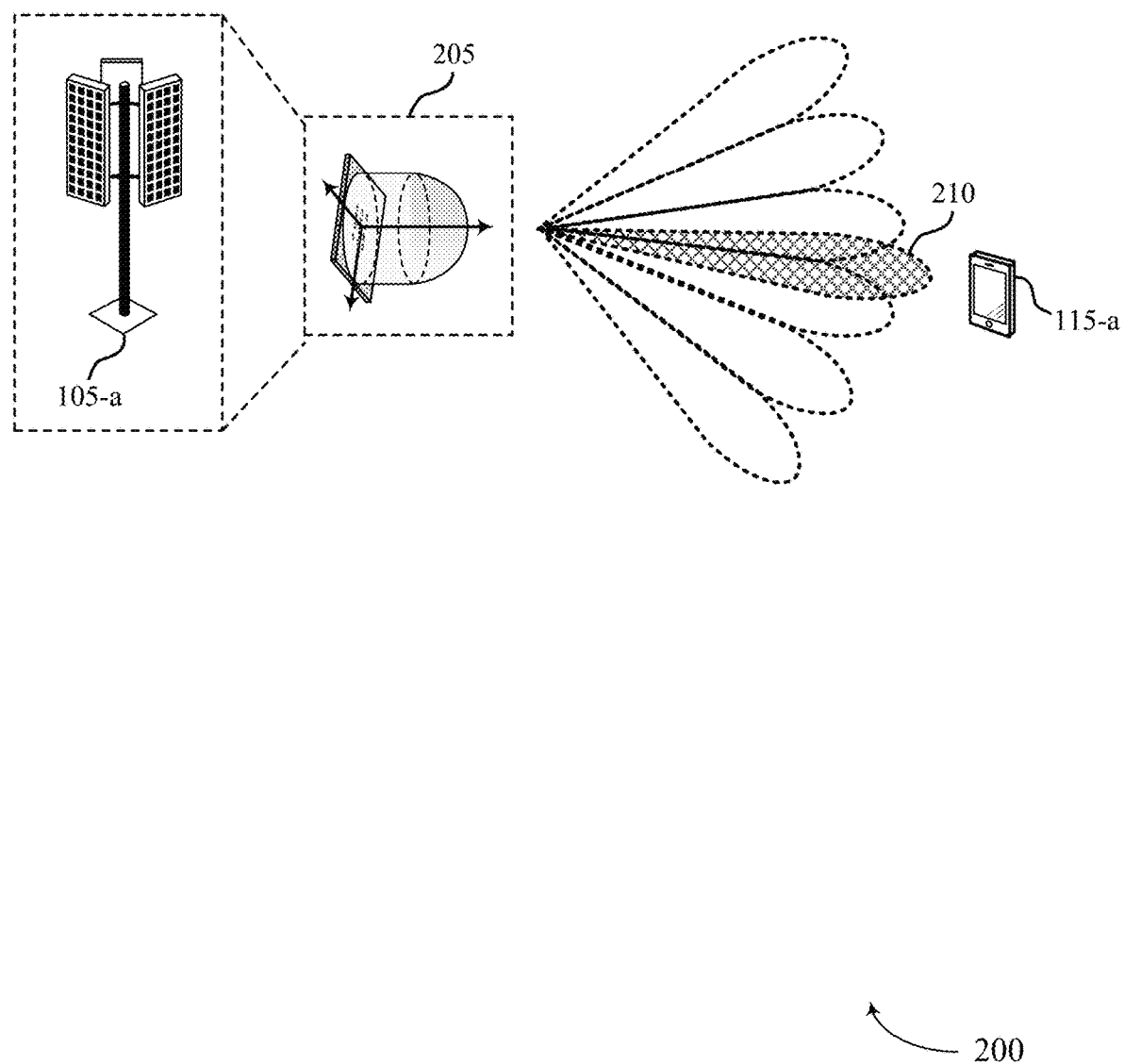

FIG. 2 shows an example of a wireless communications system 200 that supports techniques for continuous beam scanning for integrated lens antennas in accordance with one or more aspects of the present disclosure. For example, the wireless communications system 200 may support communications between a network entity 105-a and a UE 115-a, each of which may be examples of corresponding devices described with reference to FIG. 1. In some implementations, the network entity 105-a may support a lens antenna for efficient and accurate beamforming.

Wireless communications system 200 may support communications using high carrier frequencies and relatively wide system bandwidths (e.g., sub-THz systems), each of which may correspondingly support high system throughput, low latency, high traffic volume density, increased spectral energy, and relatively high gain relative to systems operating at relatively lower frequencies. To compensate for increased path loss due to the high carrier frequency (e.g., frequencies exceeding 140 GHz), however, the antenna radiation may be relatively narrow, producing narrow beams to support the high gain communications. The use of such narrow beams in high frequency systems may reduce interference between users due to the high degree of spatial separation between the narrow beams. In some cases, however, to prevent "dead spots," or areas that lack coverage, a device may produce the narrow beams using a fine grid or antenna array which may radiate in each angular spatial position of a UE 115-a with relatively low power loss.

To support efficient beamforming in high frequency systems (e.g., sub-THz systems), devices may implement power-efficient lens antennas (e.g., lens antenna arrays, integrated lens antennas) in place of or in addition to phased antenna arrays. For example, a dielectric lens antenna (such as lens antenna 205) may produce multi beam radiation patterns in a wide-angle region. In contrast with a phased array, the lens antenna 205 may avoid use of multiple RF chains per antenna element (e.g., via a phase shifter, power amplifier (PA), or low-noise amplifier (LNA)), which may reduce excess power expenditure. Instead, the lens antenna 205 may use a pre-defined grid of beams formed by placing a set of radiating elements behind the lens. Each such radiating element may then generate a beam in a certain direction, and may be switched on and off by a beam manager.

In some implementations, however, the beams generated by the lens antenna 205 may be so narrow (e.g., having a beam width of 2-4 degrees) that even relatively small adjustments (e.g., +/−2 degree adjustments) or movements of the receiver from the boresight (e.g., 0 degree center) can cause significant power losses (e.g., up to 6 dB power loss in received SNR). Thus, a device such as the network entity 105-a may implement a number of different techniques to allow for a more continuous or analogous beam tracking and scanning using the lens antenna 205. For example, one technique may implement hybrid digital-analog manipulation to support continuous beam scanning rather than scanning using a non-continuous (e.g., discrete) quantized grid of radiation angles.

In such techniques, the lens antenna capability may be extended from discrete beam scanning to continuous (e.g., "analog") beam scanning. For example, the UE 115-a may measure the received power of various discrete beams sent from the network entity 105-a, and may transmit a measurement report to the network entity 105-a, which includes a set of various beam measurements corresponding to the discrete beams. The network entity 105-a may then calculate the boresight angle of a new beam 210 (e.g., an "optimal" beam or a beam that would maximize the received power at the UE 115-a) based on a weighted combination of the discrete beams. The network entity 105-a may then temporarily add the new beam 210 to the beam codebook used for the UE 115-a, and may transmit instructions to the UE 115-a to begin monitoring the new beam 210. The network entity 105-a may then remove the new beam 210 upon a beam management decision to switch the UE 115-a to a different beam. For example, the network entity 105-a may continue to collect beam measurements including measurements for the new beam 210 from the UE 115-a, and may remove the new beam 210 once the new beam 210 has a receive power that falls below a threshold, or once the new beam is in use for a duration of time that exceeds a threshold.

The network entity 105-a may use beam measurements provided by the UE 115-a to perform an optimization procedure to find new or optimized beam directions to transmit the new beam 210. For example, the network entity 105-a may perform a calculation of the boresight angle of the new beam 210 using one or more beam prediction artificial intelligence (AI) or machine learning models, using one or more interpolation models (e.g., parabolic interpolation or any other high order interpolation of the receiver beams power), or a combination thereof. The network entity 105-a may then generate a beam via at least two antenna elements that are activated simultaneously to form a beam in the direction of the UE 115-a. The UE 115-a and the network entity 105-a may repeat the process of beam optimization and beam measurement for new beam directions, and various different optimized beams may be added and removed from the beam codebook based on UE measurement reporting.

To form the new beam 210 in the direction of the UE 115-a using continuous beam scanning techniques, the network entity 105-a may transmit multiple beams using a gain and phase combination of multiple beams to generate an equivalent new beam having a peak that is in the direction of the UE 115-a. For example, the network entity 105-a may activate multiple (e.g., more than one) antenna elements and route an input signal to the multiple antenna elements to generate the new beam 210. This beam combination may reduce the losses experienced using a phased antenna array.

Additionally, or alternatively, the continuous beam scanning techniques may increase signal quality at times where the UE 115-a is located at an angle that corresponds to a beam width edge, or at times where UE mobility (e.g., movement of UE 115-a) impacts signal quality. For example, with discrete beams, even relatively small movements of the UE 115-a may reduce the SNR by up to 3-6 dB, as the movement of UE 115-a could be away from the center of the beam width. For example, in cases where the beam width is +−2 degrees and the link distance is 200 m, a movement of the UE 115-a +/−7 m may lead to 3-6 dB SNR drop, which may degrade QoS for the UE 115-a. By transmitting the beams using a combination of gains and phases using the continuous beam scanning techniques described herein, this QoS degradation may be avoided as the UE 115-a may be located at or near the beam center when new beams are generated, added to the codebook, and used for communications. Additionally, or alternatively, the sidelobes of the new beam may be lowered relative to discrete beams, which may reduce interference to neighboring or adjacent beams serving other UEs simultaneously.

Figure 3:
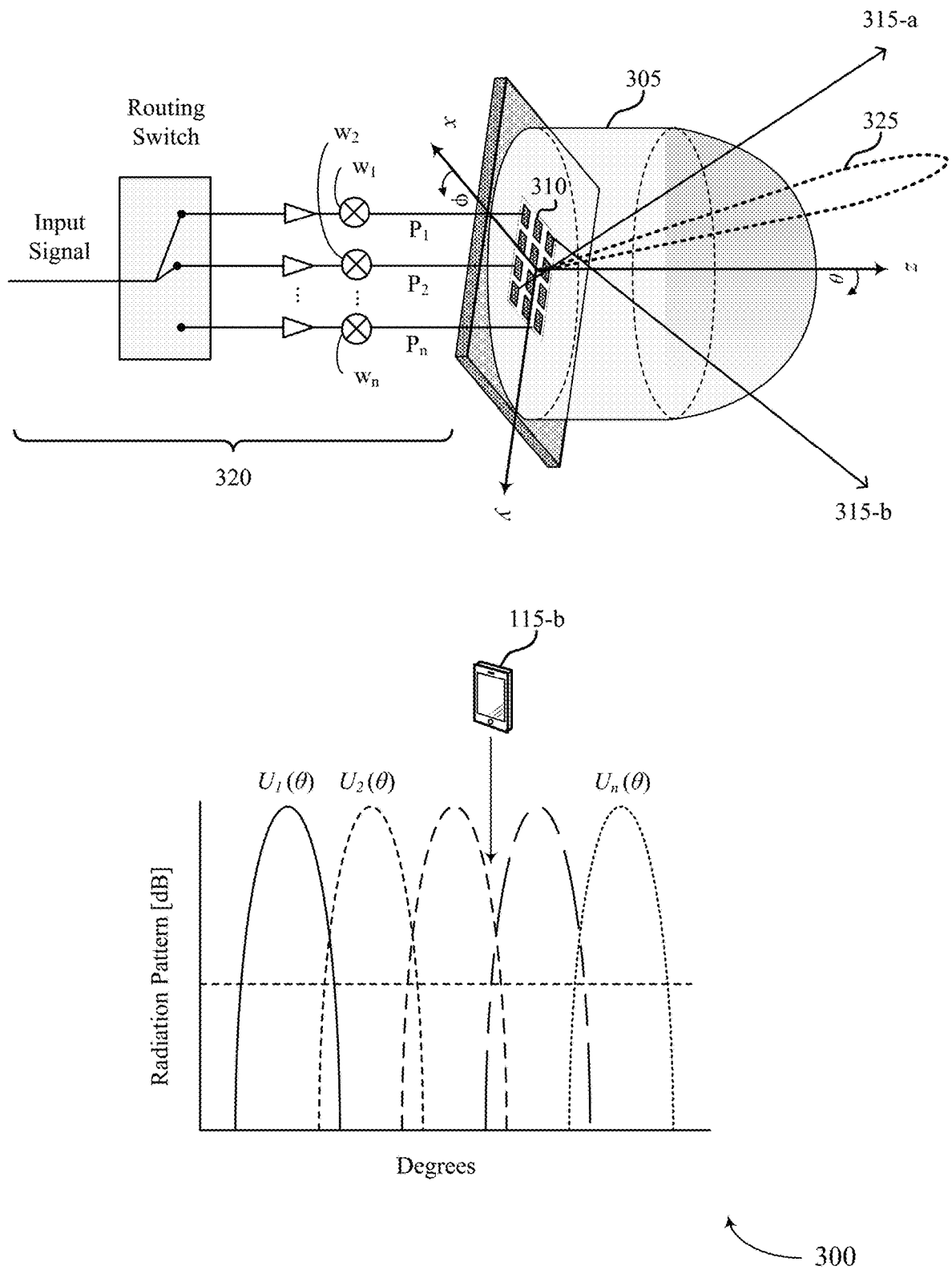
FIG. 3 shows an example of a lens antenna system diagram that supports techniques for continuous beam scanning for integrated lens antennas in accordance with one or more aspects of the present disclosure.

FIG. 3 shows an example of a lens antenna system diagram 300 that supports techniques for continuous beam scanning for integrated lens antennas in accordance with one or more aspects of the present disclosure. For example, the lens antenna 305 may be implemented at or by a network entity 105 as described herein, which may be in communication with the UE 115-b, which may be an example of a UE 115 described herein.

A lens antenna 305 may be represented by the lens antenna system diagram 300. The lens antenna 305 may include one or more antenna elements 310, each of which may radiate in a different beam direction (e.g., beam direction 315-a and beam direction 315-b). The RF back end 320 connected to the lens antenna (e.g., located behind the lens antenna in FIG. 2) may route an input signal to the one or more antenna elements 310 via one or more components (e.g., circuits, mixers, beam weighting functions). The input signal, once routed to the one or more antenna elements 310, may then be radiated in respective beam directions. In some implementations, the routing switch capability may be extended to route the input signal to one or more antenna elements 310 (e.g., simultaneously), which may increase the efficiency of beamforming and may also increase the relative number of directions that the beams may be radiated from the lens antenna 305. Additionally, or alternatively, the transmission power of the power actuators associated with the one or more antenna elements 310 that are activated may be controlled by the beam management unit in digital transmission (e.g., rather than controlled relative to a fixed power P).

The lens antenna 305 may support simultaneous activation of more than one antenna element to form a beam in the direction of a UE. For example, two antenna elements may be activated simultaneously to form a beam. In such examples, an input signal may be fed to the routing switch, which may function as a splitter of one-to-many such that the routing switch splits the signal into two or more lanes to feed the signal to the two or more antenna elements. In addition, the two associated active power actuators may support transmitting the split signal using different respective powers (e.g., $P_1$, $P_2$, up to $P_n$) such that $P_1+P_2$ is equal to the total power P. In such cases, the total power of the split signal may comply with an equivalent isotopically radiated power (EIRP) constraint for the newly formed beam 325.

In some examples, the position of the UE 115-b may be outside of the boresight of the integrated lens antenna (e.g., the position of the UE 115-b may fall outside of the point of maximum beamforming gain), which may result in link budget loss and reduced QoS. For example, if a beam grid is designed with numerous antenna elements, such that beams overlap at −3 dB, then the link budget loss may be up to 3 dB. In other examples, if the beam grid is designed with lower number of antenna elements, the beams may overlap at a lower radiation level (e.g., −6 dB), which may result in up to 6 dB link budget loss. For example, the location of the UE 115-b may fall at a location that is between boresights of multiple beams ($U_n(\theta)$), which may cause the UE 115-b to experience reduced QoS. In such cases, the lens antenna may implement different techniques to generate a new beam at any angle to more accurately direct the boresight to the location of the UE 115-b.

To generate a new beam with a boresight that is aimed at the position of the UE 115-b (which is in some examples not aligned with the beams generated by the discrete grid), the lens antenna 305 may activate one or more antenna elements 310, where each antenna element of the one or more antenna elements 310 has an applied weight $w_i$. By applying corresponding weights to the antenna elements, the sidelobes of each beam may contribute to the total accumulated energy of the newly formed beam 325. The gain and phase of the coefficient may be applied in the RF domain by lowering the power actuator power (e.g., gain) and using the phase shifter (e.g., phase). Then, the generated signal z by composition on n beams may be represented as:

$$z = \sum_{i=1}^{n} \sqrt{P} w_i x U_i(\theta_i)$$

Where x is the input signal, P is the total power of the signal, $w_i$ is the respective beam weights, and $U_i(\theta_i)$ is the radiation pattern of the $i^{th}$ beam at angle $\theta_i$ where $\theta_i$ is the angle of the sidelobe of radiation pattern $U_i(\theta_i)$ as observed by the UE 115-b. Combining a larger quantity of beams (e.g., higher n) may increase the link budget (e.g., by fractional dB) and the network entity may determine the quantity of beams to use. For example, a relatively higher n may increase directional accuracy, but may increase power consumption based on the increased quantity of antenna elements.

To increase the total signal energy when different beams paths to the UE 115-b are summed coherently, the network entity may perform an optimization or maximization of the signal energy, for example, using:

$$|z|^2 = P\sigma_x^2 \left| \sum_{i=1}^{n} w_i U_i(\theta_i) \right|^2.$$

Then, to find the set of coefficients $w_i$ corresponding to the optimized signal energy, the network entity may implement a gradient decent algorithm (e.g., a gradient steepest descent algorithm), which may be given as:

$$w_i^{(l+1)} = w_i^{(l)} + \mu \frac{\partial |z|^2}{\partial w_i^{(l)*}},$$

where l denotes the gradient steepest descent iteration, and the constraint of $\Sigma_{i=1}^{n}|w_i|^2=1$ may be applied so that the total transmit power is preserved, and such that EIRP is also preserved.

Upon determining the coefficients $w_i$, the network entity may calculate the gradient for updating the beam coefficients. The network entity may calculate the gradient as follows:

$$\frac{\partial |z|^2}{\partial w_i^*} = P\sigma_x^2 \frac{\partial}{\partial w_i^*} \left\{ \left| \sum_{i=1}^{n} w_i U_i(\theta_i) \right|^2 \right\}$$

$$= P\sigma_x^2 \frac{\partial}{\partial w_i^*} \sum_{i_1=1}^{n} w_{i_1} U_{i_1}(\theta_{i_1}) \sum_{i_2=1}^{n} w_{i_2}^* U_{i_2}^*(\theta_{i_2})$$

$$= P\sigma_x^2 U_i^*(\theta_i) \sum_{i_1=1}^{n} w_{i_1} U_{i_1}(\theta_{i_1}).$$

The calculated gradient may then update the rule as:

$$w_i^{(l+1)} = w_i^{(l)} + \delta \left( U_i^*(\theta_i) \sum_{i_1=1}^{n} w_{i_1}^{(l)} U_{i_1}(\theta_{i_1}) \right),$$

which is then followed by a normalization step for the beam weights:

$$w_i^{(l+1)} \Leftarrow \frac{w_i^{(l+1)}}{\sqrt{\sum_{i=1}^{n} |w_i^{(l+1)}|^2}},$$

with the trivial guess of uniform beam weight amongst the n beams to be weighted, where $w_i^{(l=0)}=1/\sqrt{n}$ for every i=1-n.

Then the maximum over the contour may be equal to $\sum_{i=1}^{n}|w_i|^2=1$. Once the network entity determines the optimal or maximum beam weighing coefficients for the new beam, the network entity may transmit the new beam in a direction of the UE 115-b. In some examples, the optimized beam weighing coefficients for the optimized beam may have reduced sidelobes, which may reduce the beam interference to other UEs served by adjacent beams.

Figure 4:
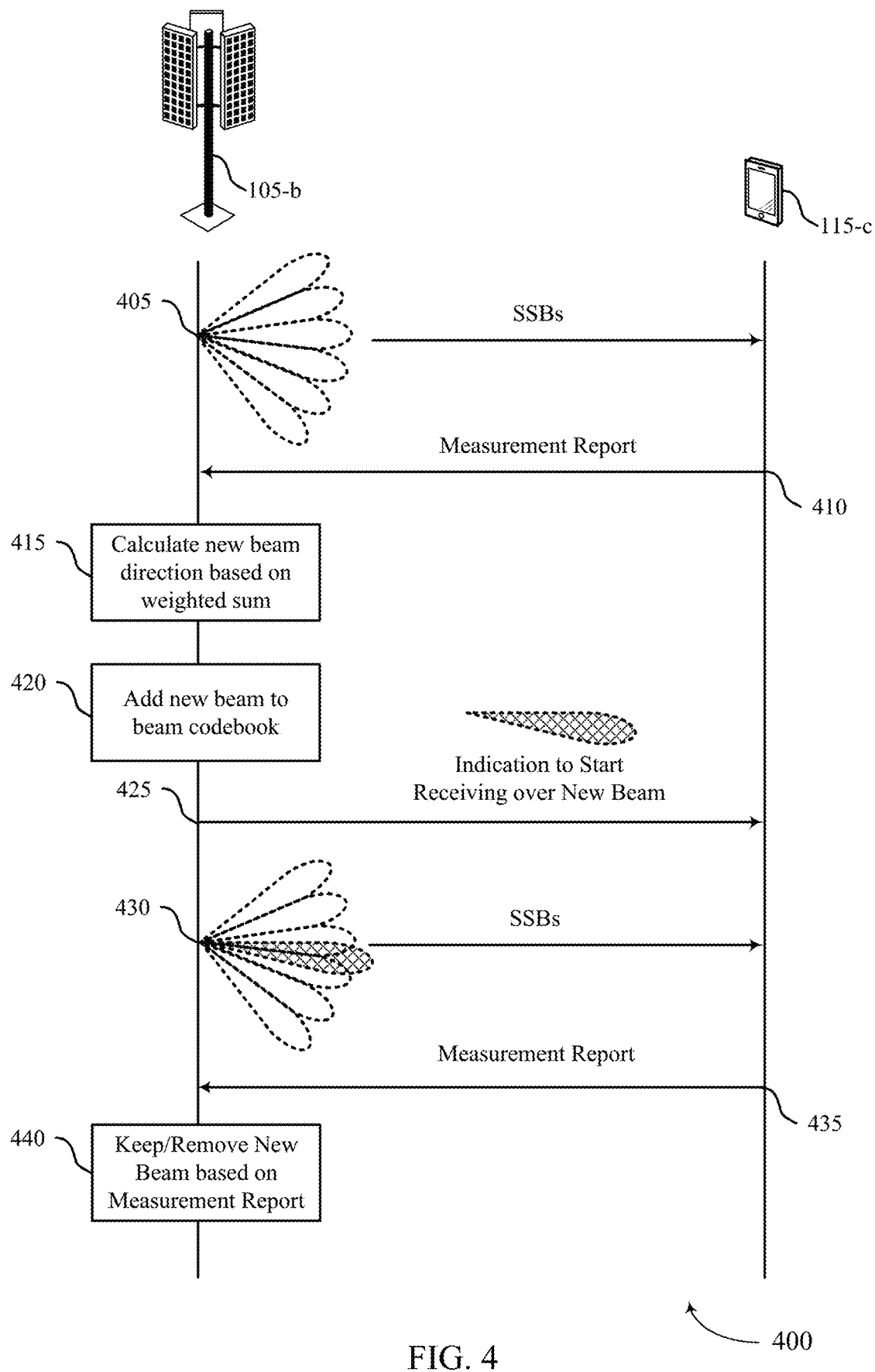
FIG. 4 shows an example of a process flow that supports techniques for continuous beam scanning for integrated lens antennas in accordance with one or more aspects of the present disclosure.

FIG. 4 shows an example of a process flow 400 that supports techniques for continuous beam scanning for integrated lens antennas in accordance with one or more aspects of the present disclosure. The process flow 400 illustrates a process for optimizing or refining a serving beam direction using a lens antenna array at a network entity 105-b, which may be an example of a network entity 105 described herein. The network entity 105-b may be in communication with a UE 115-c, which may be an example of a UE 115 described herein.

In the following description of process flow 400, the operations may be performed in a different order than the order shown, or other operations may be added or removed from the process flow 400. For example, some operations may also be left out of process flow 400, may be performed in different orders or at different times, or other operations may be added to process flow 400. Although the network entity 105-b and the UE 115-c are shown performing the operations of process flow 400, some aspects of some operations may also be performed by one or more other wireless or network devices.

At 405, the network entity 105-b may transmit SSBs via different beams sent in different directions. The SSBs may be part of a set of SSBs that correspond to the different beams included in a beam codebook.

At 410, the UE 115-c may perform various beam measurements of the SSBs and may send a measurement report to the network entity 105-b, which may include measured power per each beam.

At 415, the network entity 105-b may calculate a new beam direction (e.g., an optimized beam with a boresight directed toward the UE 115-c) based on a weighted sum of existing beams. For example, the network entity 105-b may calculate a weighted sum of the beam weights corresponding to the beams transmitted in 405, and the new beam direction may be based on the calculated weighted sum.

At 420, the network entity 105-b may add the new beam to the beam codebook associated with the UE 115-c as a temporary beam. The network entity 105-b may assign the new beam a beam index (e.g., INDX), which may be used to identify the new beam. The beam index may be associated with the first serving beam, and may be different from a set of beam indices for the other beams in the beam codebook.

At 425, the network entity 105-b may transmit a message to the UE 115-c that instructs the UE 115-c to begin receiving communications over the new beam INDX as the serving beam. In some examples, the message may be a first serving beam indication that includes instructions to monitor the INDX beam as a serving beam that is different from each of the other beams of the beam codebook.

In some examples, the network entity 105-b may generate the new serving beam by routing an input signal to at least two antenna elements of a lens antenna, and then transmitting the serving beam in a direction that is based on the beam measurement report. In such examples, the input signal may be split into two input signals having different respective input powers and different respective beam weights at each antenna element.

In some examples, the network entity 105-b may generate the new serving beam using one or more beam coefficients, an input signal at the network entity, a radiation pattern of each of the beams of the beam codebook, an angle of one or more sidelobes associated with the radiation pattern, or any combination thereof. In some examples, the network entity 105-b may further apply a selection algorithm (e.g., a gradient decent algorithm) to the beam weight coefficients included in the first set of beam measurements to determine an optimized set of beam weight measurements for the new serving beam. Additionally or alternatively, the network entity 105-b may also be capable of implementing one or more machine learning models, a parabolic interpolation model, a high order interpolation model, one or more optimization procedures, or any combination thereof, to determine the direction of the new serving beam.

At 430, the UE 115-c may receive data over the new beam INDX and may continue to measure SSBs including beam power over the serving beam and the other beams of the beam codebook.

At 435, the UE 115-c may report the measured power per each beam (e.g., in a second measurement report), including the new beam INDX and the other beams included in the beam codebook.

At 440, if the calculations performed by the network entity 105-b show that the newly added beam INDX has a QoS that is below a threshold (e.g., the INDX beam is used for a time that exceeds a threshold or the new beam INDX has been unused for a threshold period of time, or if the measured power of the new beam INDX is below a threshold) the network entity 105-b may remove the INDX beam from the beam codebook. In some examples, the network entity 105-b may repeat the beam optimization procedure to identify a new serving beam to add to the codebook.

In some examples, the network entity 105-b may use the measurements included in the second measurement report to calculate a direction of a second new beam. For example, the network entity 105-b may calculate the direction of the second new beam using a weighted sum of the measurements of the beams provided in the second measurement report.

Figure 5:
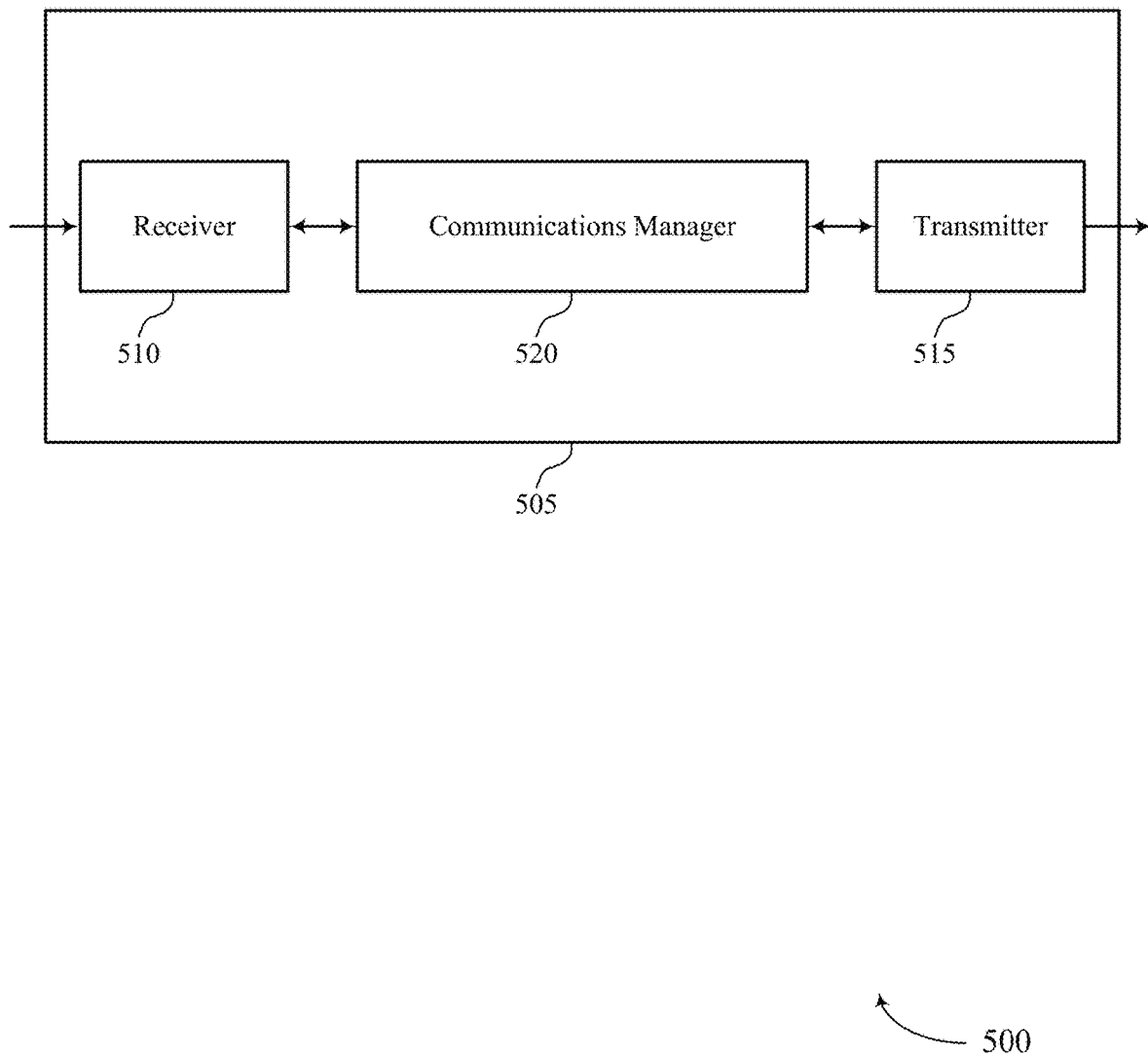
FIGS. 5 and 6 show block diagrams of devices that support techniques for continuous beam scanning for integrated lens antennas in accordance with one or more aspects of the present disclosure.

FIG. 5 shows a block diagram 500 of a device 505 that supports techniques for continuous beam scanning for integrated lens antennas in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of techniques for continuous beam scanning for integrated lens antennas as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a network entity in accordance with examples as disclosed herein. For example, the communications manager 520 may be configured as or otherwise support a means for transmitting a set of synchronization signals via a set of multiple beams of a beam codebook. The communications manager 520 may be configured as or otherwise support a means for receiving a first measurement report indicating a first set of beam measurements corresponding to the set of multiple beams of the beam codebook based on the set of synchronization signals. The communications manager 520 may be configured as or otherwise support a means for transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The communications manager 520 may be configured as or otherwise support a means for receiving a second measurement report indicating a second set of beam measurements corresponding to the set of multiple beams and indicating at least one beam measurement associated with the first serving beam. The communications manager 520 may be configured as or otherwise support a means for communicating one or more messages via the first serving beam based on the at least one beam measurement associated with the first serving beam satisfying a threshold.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources, increased beam steering accuracy and directional accuracy, increased QoS, and increased link budget.

Figure 6:
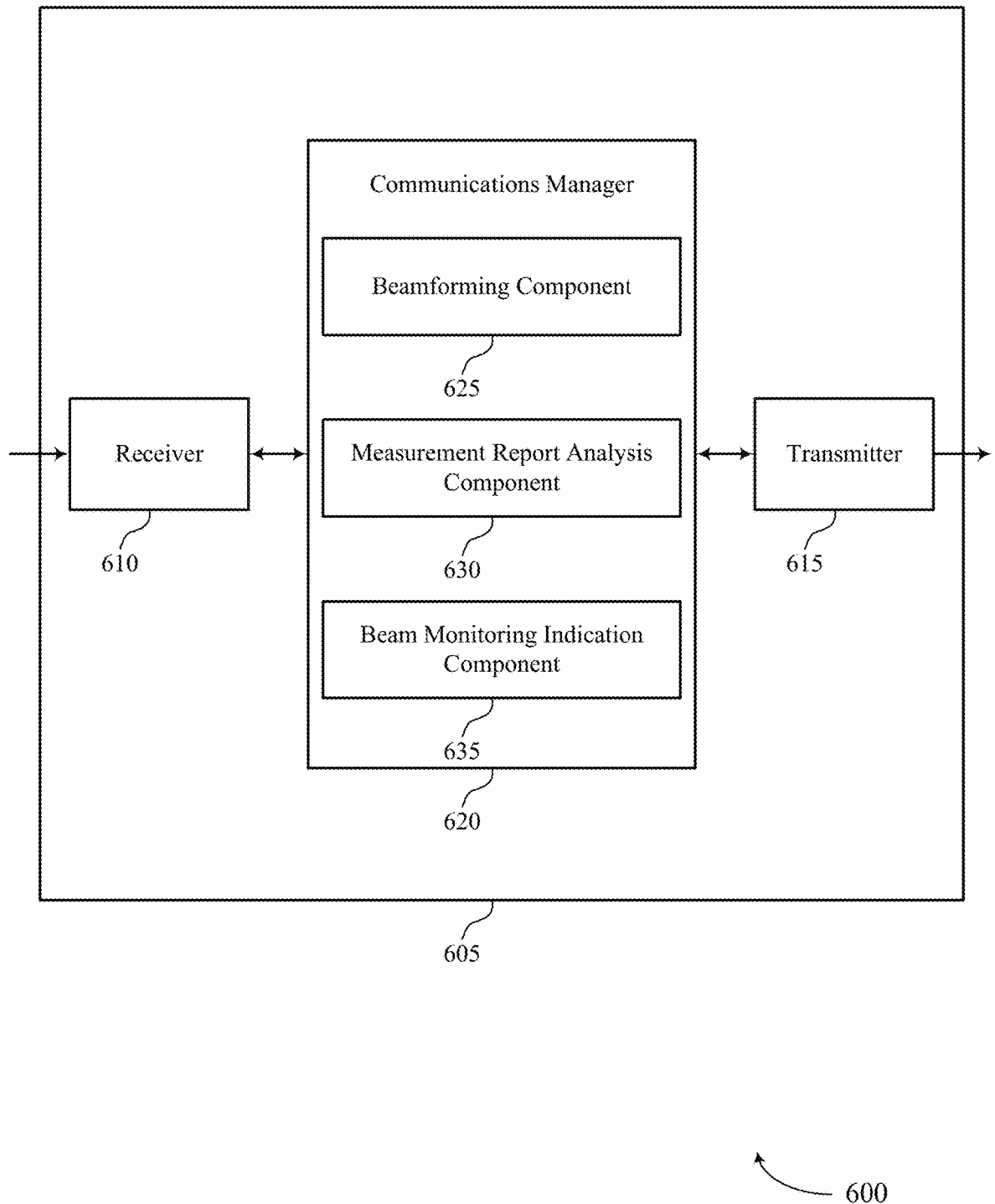

FIG. 6 shows a block diagram 600 of a device 605 that supports techniques for continuous beam scanning for integrated lens antennas in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of techniques for continuous beam scanning for integrated lens antennas as described herein. For example, the communications manager 620 may include a beamforming component 625, a measurement report analysis component 630, a beam monitoring indication component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a network entity in accordance with examples as disclosed herein. The beamforming component 625 may be configured as or otherwise support a means for transmitting a set of synchronization signals via a set of multiple beams of a beam codebook. The measurement report analysis component 630 may be configured as or otherwise support a means for receiving a first measurement report indicating a first set of beam measurements corresponding to the set of multiple beams of the beam codebook based on the set of synchronization signals. The beam monitoring indication component 635 may be configured as or otherwise support a means for transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The measurement report analysis component 630 may be configured as or otherwise support a means for receiving a second measurement report indicating a second set of beam measurements corresponding to the set of multiple beams and indicating at least one beam measurement associated with the first serving beam. The beamforming component 625 may be configured as or otherwise support a means for communicating one or more messages via the first serving beam based on the at least one beam measurement associated with the first serving beam satisfying a threshold.

Figure 7:
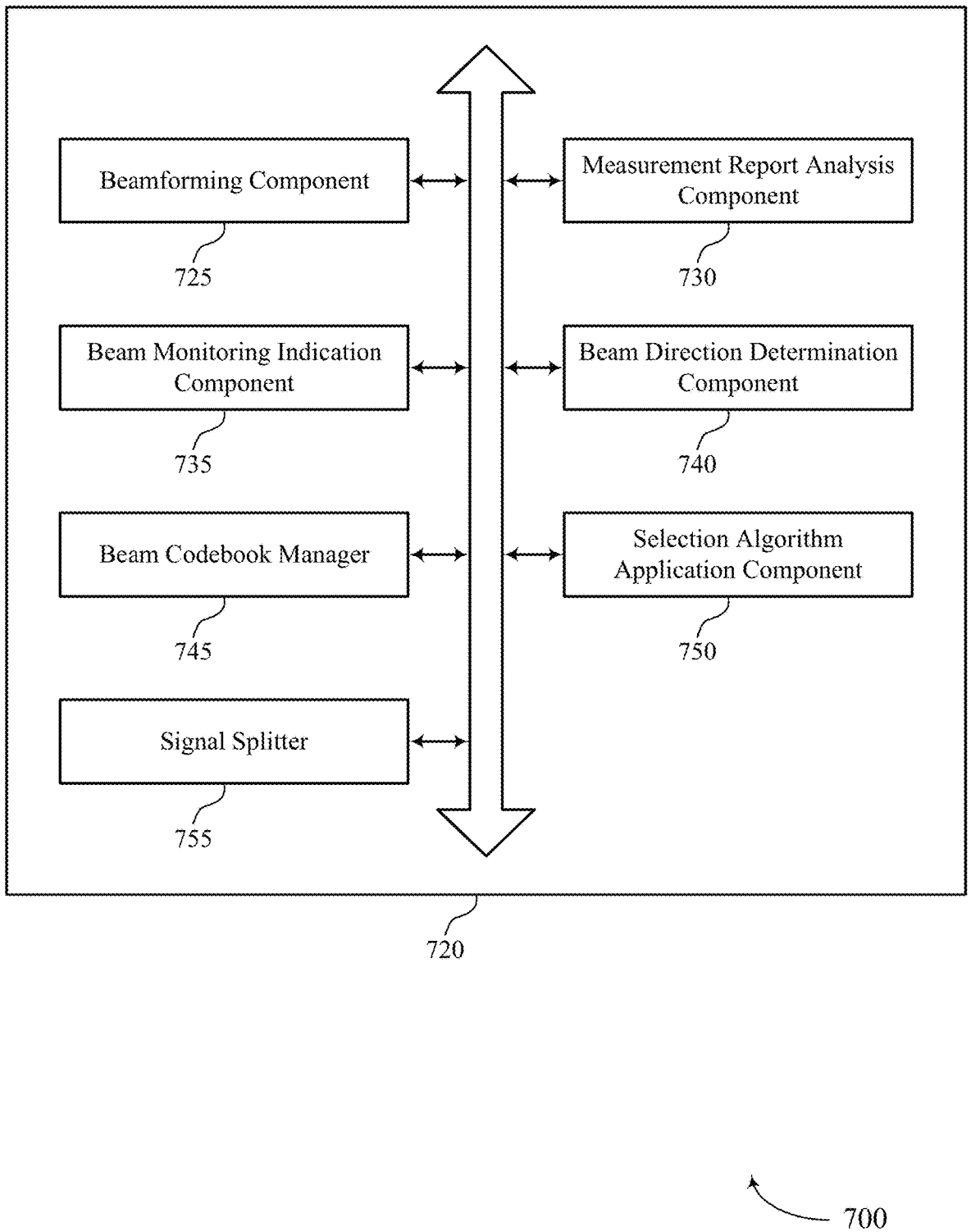
FIG. 7 shows a block diagram of a communications manager that supports techniques for continuous beam scanning for integrated lens antennas in accordance with one or more aspects of the present disclosure.

FIG. 7 shows a block diagram 700 of a communications manager 720 that supports techniques for continuous beam scanning for integrated lens antennas in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for continuous beam scanning for integrated lens antennas as described herein. For example, the communications manager 720 may include a beamforming component 725, a measurement report analysis component 730, a beam monitoring indication component 735, a beam direction determination component 740, a beam codebook manager 745, a selection algorithm application component 750, a signal splitter 755, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication at a network entity in accordance with examples as disclosed herein. The beamforming component 725 may be configured as or otherwise support a means for transmitting a set of synchronization signals via a set of multiple beams of a beam codebook. The measurement report analysis component 730 may be configured as or otherwise support a means for receiving a first measurement report indicating a first set of beam measurements corresponding to the set of multiple beams of the beam codebook based on the set of synchronization signals. The beam monitoring indication component 735 may be configured as or otherwise support a means for transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report. In some examples, the measurement report analysis component 730 may be configured as or otherwise support a means for receiving a second measurement report indicating a second set of beam measurements corresponding to the set of multiple beams and indicating at least one beam measurement associated with the first serving beam. In some examples, the beamforming component 725 may be configured as or otherwise support a means for communicating one or more messages via the first serving beam based on the at least one beam measurement associated with the first serving beam satisfying a threshold.

In some examples, the beam direction determination component 740 may be configured as or otherwise support a means for performing a weighted sum of the first set of beam measurements corresponding to each of the set of multiple beams of the beam codebook, where the first serving beam is associated with a beam direction that is based on the weighted sum.

In some examples, the beam codebook manager 745 may be configured as or otherwise support a means for generating, based on the first set of beam measurements, a beam index associated with the first serving beam, the beam index different from a set of beam indices for the set of multiple beams of the beam codebook. In some examples, the beam codebook manager 745 may be configured as or otherwise support a means for transmitting an indication of the beam codebook including the beam index associated with the first serving beam.

In some examples, to support receiving the second measurement report indicating the second set of beam measurements, the measurement report analysis component 730 may be configured as or otherwise support a means for receiving one or more respective received power measurements for each of the set of multiple beams of the beam codebook and the first serving beam.

In some examples, the beam codebook manager 745 may be configured as or otherwise support a means for generating, for the beam codebook, a beam index associated with a second serving beam based on removal of the first serving beam from the beam codebook. In some examples, the beam codebook manager 745 may be configured as or otherwise support a means for transmitting a second serving beam indication including instructions to monitor the second serving beam that is different from each of the set of multiple beams of the beam codebook and the first serving beam.

In some examples, the beamforming component 725 may be configured as or otherwise support a means for generating the first serving beam by routing an input signal to at least two antenna elements of the network entity. In some examples, the beamforming component 725 may be configured as or otherwise support a means for transmitting, using the at least two antenna elements, the first serving beam in a direction that is based on the first set of beam measurements of the first measurement report.

In some examples, the signal splitter 755 may be configured as or otherwise support a means for splitting the input signal into two input signals having different respective input powers at each antenna element of the at least two antenna elements.

In some examples, the beamforming component 725 may be configured as or otherwise support a means for applying one or more beam weights to each antenna element of the at least two antenna elements.

In some examples, the beamforming component 725 may be configured as or otherwise support a means for generating the first serving beam based on one or more beam coefficients, an input signal at the network entity, a radiation pattern of each of the set of multiple beams, an angle of one or more sidelobes associated with the radiation pattern, or any combination thereof.

In some examples, the selection algorithm application component 750 may be configured as or otherwise support a means for applying a selection algorithm to a set of multiple beam weight coefficients included in the first set of beam measurements to determine a set of beam weight coefficients associated with the first serving beam. In some examples, the beamforming component 725 may be configured as or otherwise support a means for transmitting the first serving beam according to a signal energy that is based on the set of beam weight coefficients.

In some examples, the selection algorithm includes a gradient decent algorithm.

In some examples, the beam direction determination component 740 may be configured as or otherwise support a means for determining a direction of the first serving beam based on a machine learning model, a parabolic interpolation of the first set of beam measurements, a high order interpolation of the first set of beam measurements, one or more optimization procedures, or any combination thereof.

In some examples, the threshold includes a receive power threshold, a time duration threshold, a beam selection threshold, or any combination thereof.

Figure 8:
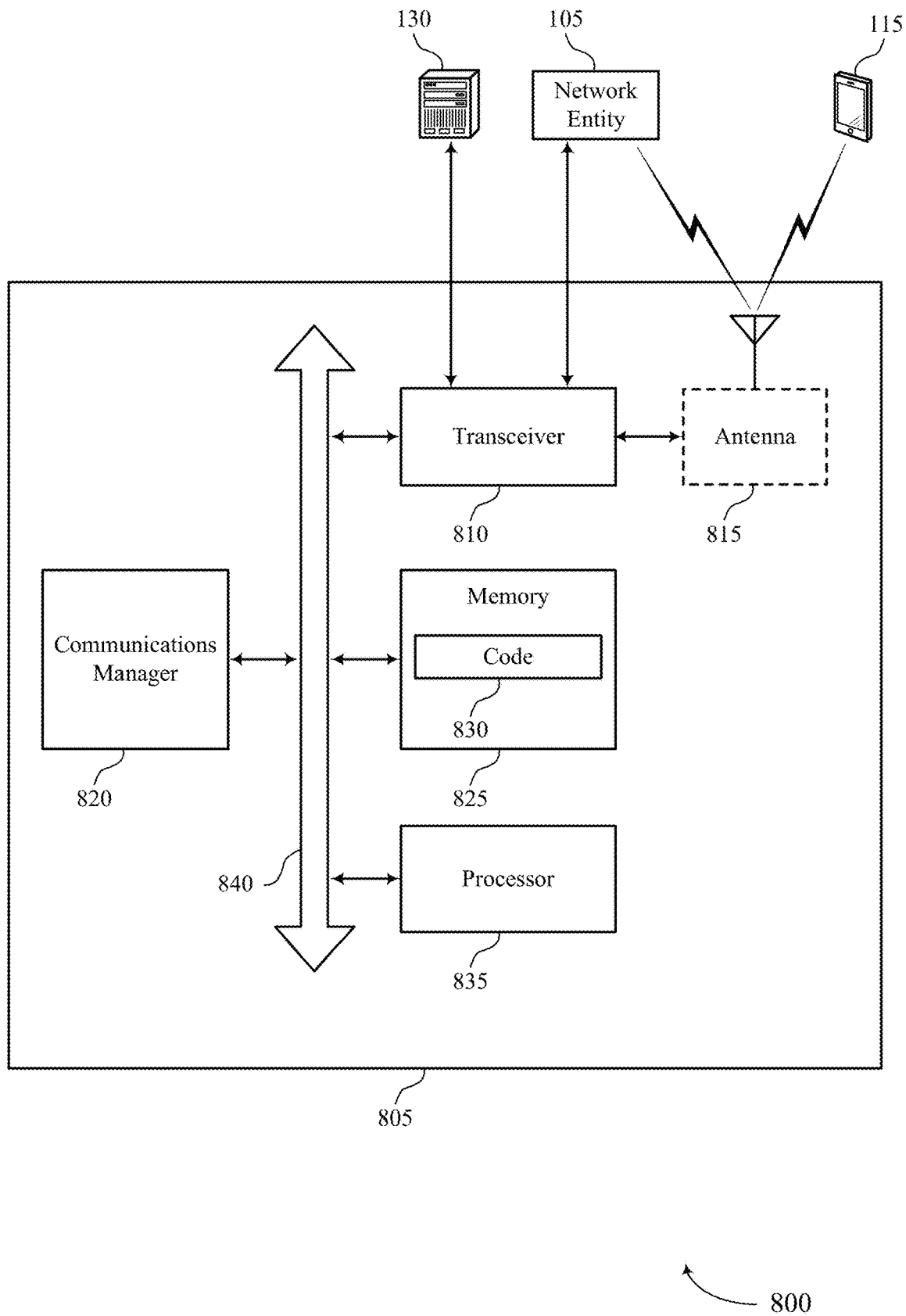
FIG. 8 shows a diagram of a system including a device that supports techniques for continuous beam scanning for integrated lens antennas in accordance with one or more aspects of the present disclosure.

FIG. 8 shows a diagram of a system 800 including a device 805 that supports techniques for continuous beam scanning for integrated lens antennas in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or memory components (for example, the processor 835, or the memory 825, or both), may be included in a chip or chip assembly that is installed in the device 805. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting techniques for continuous beam scanning for integrated lens antennas). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805. The processor 835 may be any one or more suitable processors capable of executing scripts or instructions of one or more software programs stored in the device 805 (such as within the memory 825). In some implementations, the processor 835 may be a component of a processing system. A processing system may generally refer to a system or series of machines or components that receives inputs and processes the inputs to produce a set of outputs (which may be passed to other systems or components of, for example, the device 805). For example, a processing system of the device 805 may refer to a system including the various other components or subcomponents of the device 805, such as the processor 835, or the transceiver 810, or the communications manager 820, or other components or combinations of components of the device 805. The processing system of the device 805 may interface with other components of the device 805, and may process information received from other components (such as inputs or signals) or output information to other components. For example, a chip or modem of the device 805 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 805 may transmit information output from the chip or modem. Additionally, or alternatively, in some implementations, the one or more interfaces may refer to an interface between the processing system of the chip or modem and a receiver, such that the device 805 may obtain information or signal inputs, and the information may be passed to the processing system. A person having ordinary skill in the art will readily recognize that a first interface also may obtain information or signal inputs, and a second interface also may output information or signal outputs.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at a network entity in accordance with examples as disclosed herein. For example, the communications manager 820 may be configured as or otherwise support a means for transmitting a set of synchronization signals via a set of multiple beams of a beam codebook. The communications manager 820 may be configured as or otherwise support a means for receiving a first measurement report indicating a first set of beam measurements corresponding to the set of multiple beams of the beam codebook based on the set of synchronization signals. The communications manager 820 may be configured as or otherwise support a means for transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The communications manager 820 may be configured as or otherwise support a means for receiving a second measurement report indicating a second set of beam measurements corresponding to the set of multiple beams and indicating at least one beam measurement associated with the first serving beam. The communications manager 820 may be configured as or otherwise support a means for communicating one or more messages via the first serving beam based on the at least one beam measurement associated with the first serving beam satisfying a threshold.

By including or configuring the communications manager 820 in accordance with examples as described herein, the device 805 may support techniques for improved communication reliability, reduced latency, improved user experience related to increased QoS and beam accuracy, more efficient utilization of communication resources, improved coordination between devices, increased link budget, increased beam steering accuracy, and increased receive power.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, the processor 835, the memory 825, the code 830, or any combination thereof. For example, the code 830 may include instructions executable by the processor 835 to cause the device 805 to perform various aspects of techniques for continuous beam scanning for integrated lens antennas as described herein, or the processor 835 and the memory 825 may be otherwise configured to perform or support such operations.

Figure 9:
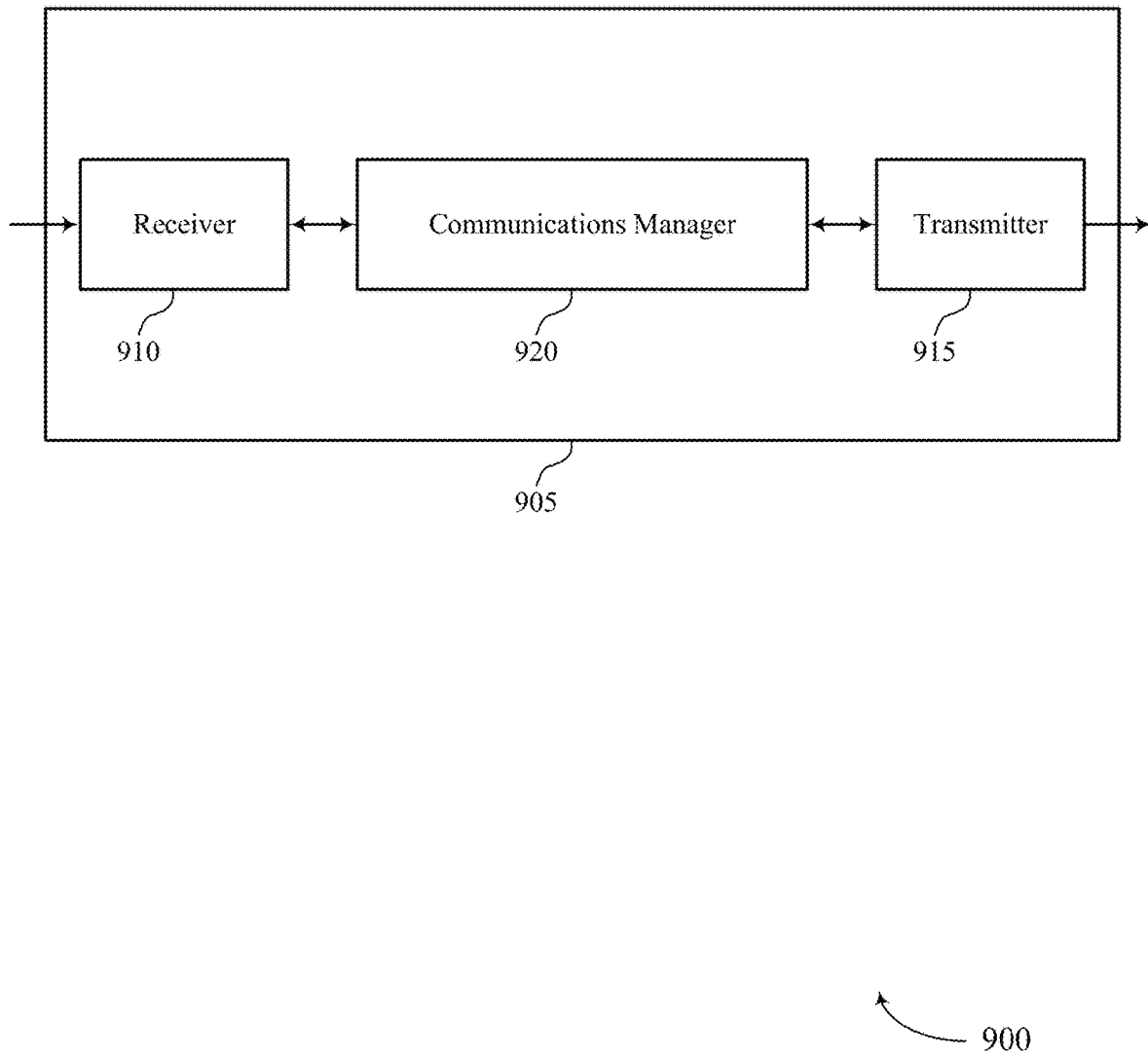
FIGS. 9 and 10 show block diagrams of devices that support techniques for continuous beam scanning for integrated lens antennas in accordance with one or more aspects of the present disclosure.

FIG. 9 shows a block diagram 900 of a device 905 that supports techniques for continuous beam scanning for integrated lens antennas in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for continuous beam scanning for integrated lens antennas). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for continuous beam scanning for integrated lens antennas). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for continuous beam scanning for integrated lens antennas as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving a set of synchronization signals via a set of multiple beams of a beam codebook. The communications manager 920 may be configured as or otherwise support a means for transmitting a first measurement report including a first set of beam measurements corresponding to the set of multiple beams of the beam codebook based on the set of synchronization signals. The communications manager 920 may be configured as or otherwise support a means for receiving a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The communications manager 920 may be configured as or otherwise support a means for transmitting a second measurement report indicating a second set of beam measurements corresponding to the set of multiple beams and at least one beam measurement associated with the first serving beam. The communications manager 920 may be configured as or otherwise support a means for communicating one or more messages via the first serving beam based on the at least one beam measurement associated with the first serving beam satisfying a threshold.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources, increased beam steering accuracy and directional accuracy, increased QoS, and increased link budget.

Figure 10:
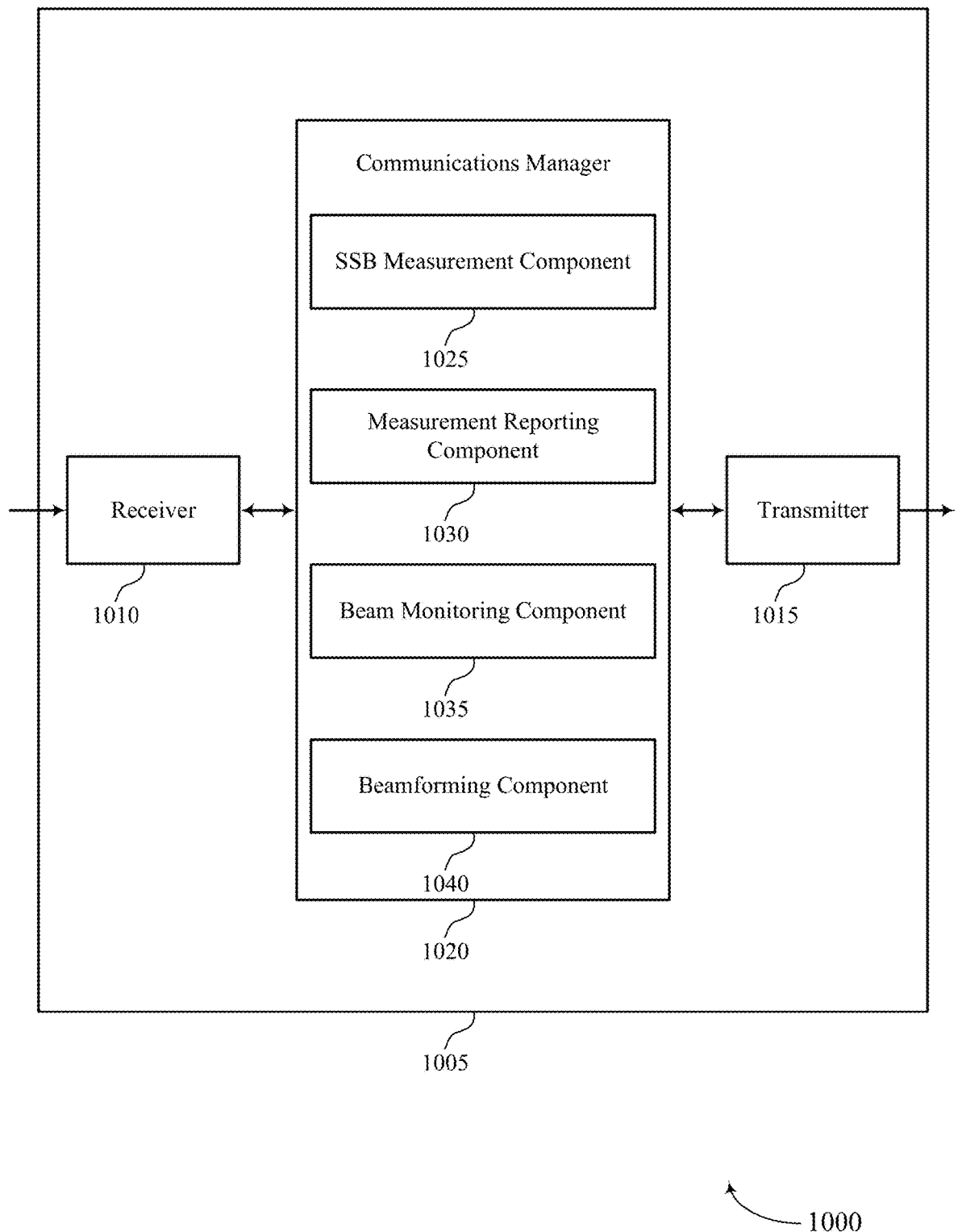

FIG. 10 shows a block diagram 1000 of a device 1005 that supports techniques for continuous beam scanning for integrated lens antennas in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for continuous beam scanning for integrated lens antennas). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for continuous beam scanning for integrated lens antennas). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for continuous beam scanning for integrated lens antennas as described herein. For example, the communications manager 1020 may include an SSB measurement component 1025, a measurement reporting component 1030, a beam monitoring component 1035, a beamforming component 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The SSB measurement component 1025 may be configured as or otherwise support a means for receiving a set of synchronization signals via a set of multiple beams of a beam codebook. The measurement reporting component 1030 may be configured as or otherwise support a means for transmitting a first measurement report including a first set of beam measurements corresponding to the set of multiple beams of the beam codebook based on the set of synchronization signals. The beam monitoring component 1035 may be configured as or otherwise support a means for receiving a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The measurement reporting component 1030 may be configured as or otherwise support a means for transmitting a second measurement report indicating a second set of beam measurements corresponding to the set of multiple beams and at least one beam measurement associated with the first serving beam. The beamforming component 1040 may be configured as or otherwise support a means for communicating one or more messages via the first serving beam based on the at least one beam measurement associated with the first serving beam satisfying a threshold.

Figure 11:
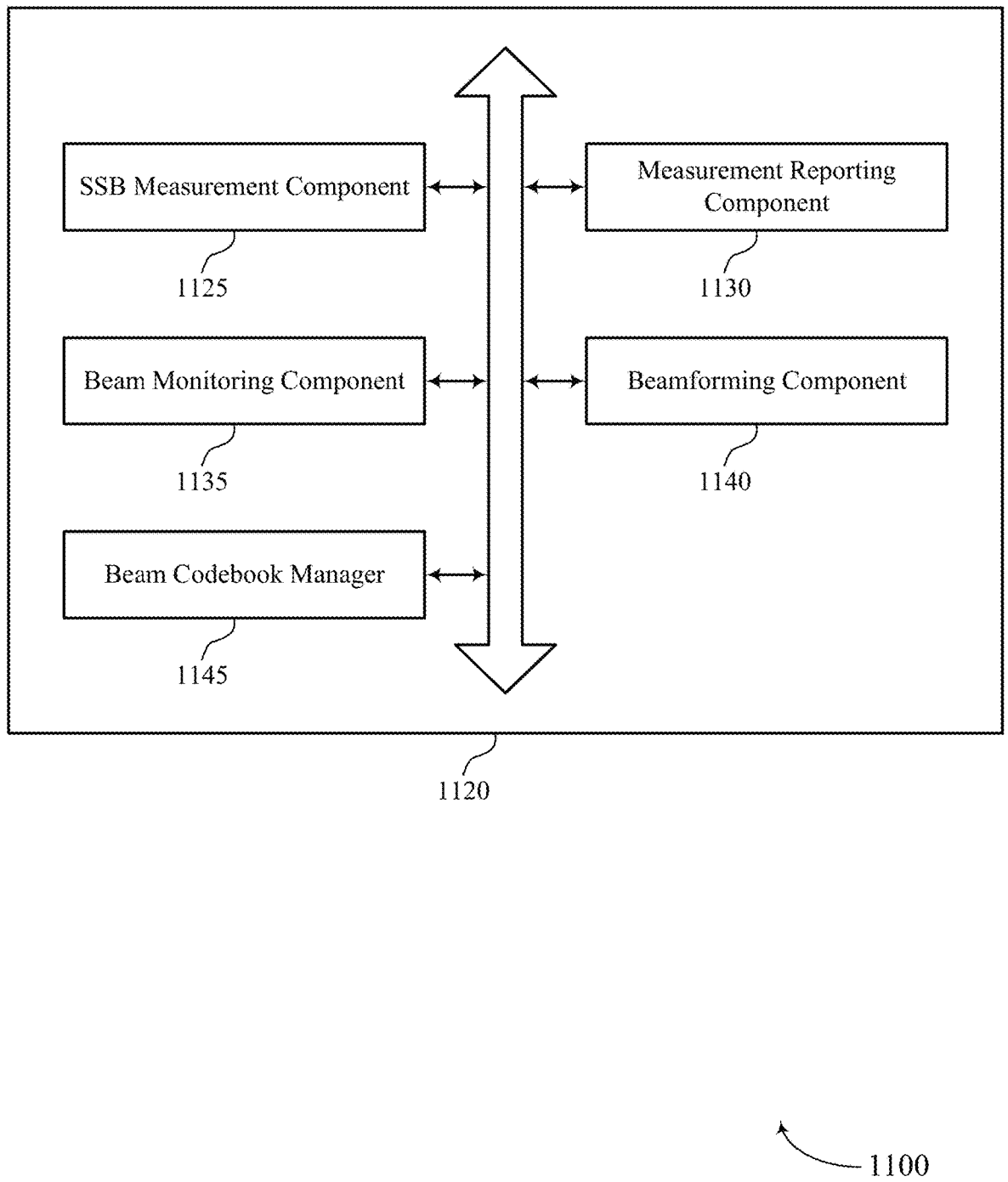
FIG. 11 shows a block diagram of a communications manager that supports techniques for continuous beam scanning for integrated lens antennas in accordance with one or more aspects of the present disclosure.

FIG. 11 shows a block diagram 1100 of a communications manager 1120 that supports techniques for continuous beam scanning for integrated lens antennas in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for continuous beam scanning for integrated lens antennas as described herein. For example, the communications manager 1120 may include an SSB measurement component 1125, a measurement reporting component 1130, a beam monitoring component 1135, a beamforming component 1140, a beam codebook manager 1145, or any combination thereof. Each of these components may communicate, directly or indirectly, with one another (e.g., via one or more buses).

The communications manager 1120 may support wireless communication at a UE in accordance with examples as disclosed herein. The SSB measurement component 1125 may be configured as or otherwise support a means for receiving a set of synchronization signals via a set of multiple beams of a beam codebook. The measurement reporting component 1130 may be configured as or otherwise support a means for transmitting a first measurement report including a first set of beam measurements corresponding to the set of multiple beams of the beam codebook based on the set of synchronization signals. The beam monitoring component 1135 may be configured as or otherwise support a means for receiving a first serving beam indication including instructions to monitor a first serving beam that is different from each of the set of multiple beams of the beam codebook used for transmission of the set of synchronization signals, where the first serving beam is based on the first set of beam measurements indicated by the first measurement report. In some examples, the measurement reporting component 1130 may be configured as or otherwise support a means for transmitting a second measurement report indicating a second set of beam measurements corresponding to the set of multiple beams and at least one beam measurement associated with the first serving beam. The beamforming component 1140 may be configured as or otherwise support a means for communicating one or more messages via the first serving beam based on the at least one beam measurement associated with the first serving beam satisfying a threshold.

In some examples, the beam monitoring component 1135 may be configured as or otherwise support a means for receiving the first serving beam that is based on a weighted sum of the first set of beam measurements corresponding to each of the set of multiple beams of the beam codebook.

In some examples, to support receiving the first serving beam indication, the beam codebook manager 1145 may be configured as or otherwise support a means for receiving an indication of the beam codebook including a beam index associated with the first serving beam based on the first set of beam measurements, the beam index different from a set of beam indices for the set of multiple beams of the beam codebook.

In some examples, to support transmitting the second measurement report indicating the second set of beam measurements, the measurement reporting component 1130 may be configured as or otherwise support a means for transmitting one or more respective received power measurements for each of the set of multiple beams of the beam codebook and the first serving beam.

In some examples, the beam codebook manager 1145 may be configured as or otherwise support a means for receiving an indication of a beam index associated with a second serving beam that is different from the first serving beam based on the first serving beam failing to satisfy the threshold. In some examples, the beam codebook manager 1145 may be configured as or otherwise support a means for receiving a second serving beam indication including instructions to monitor the second serving beam that is different from each of the set of multiple beams of the beam codebook and the first serving beam.

In some examples, the threshold includes a receive power threshold, a time duration threshold, a beam selection threshold, or any combination thereof.

Figure 12:
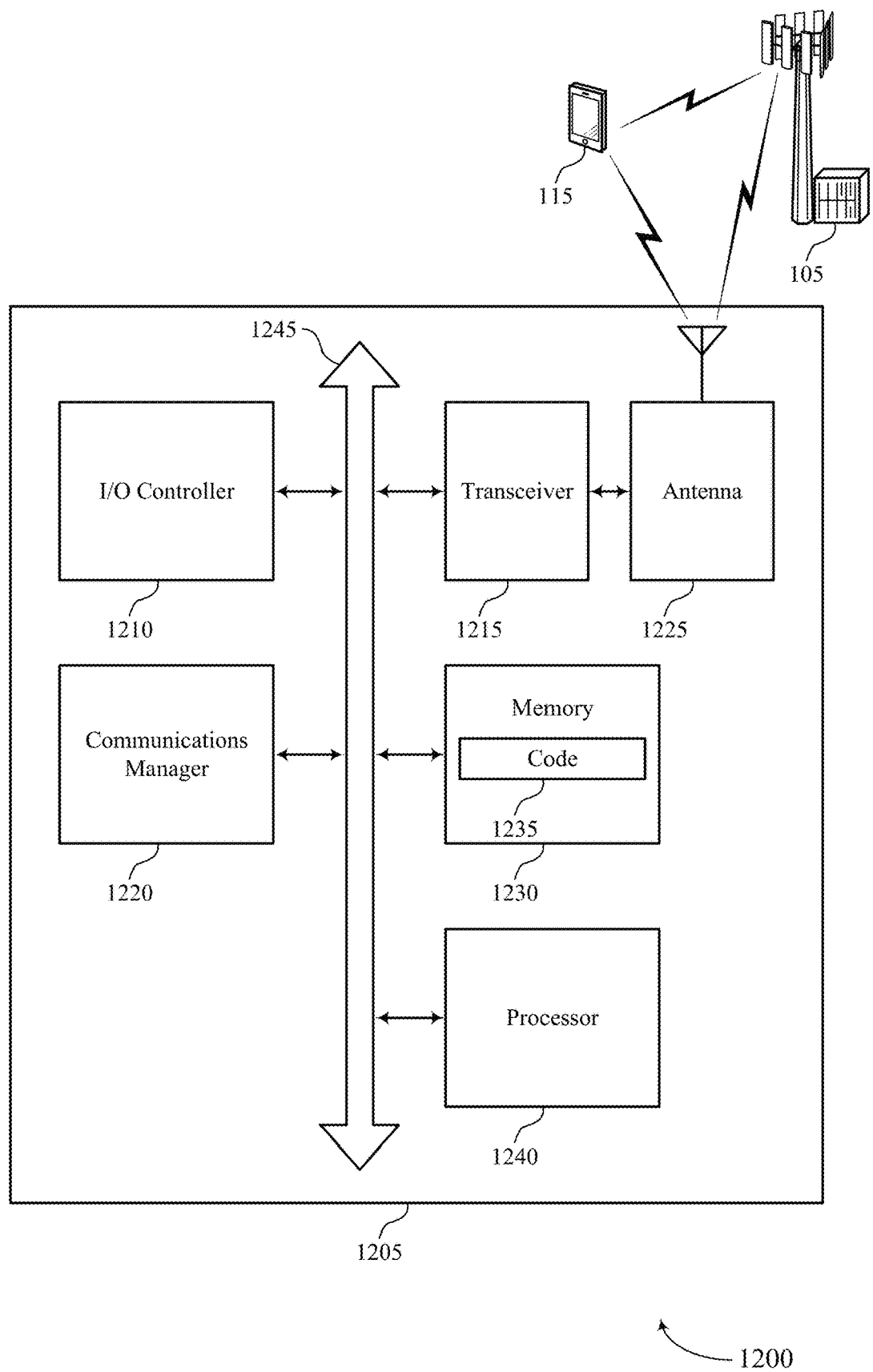
FIG. 12 shows a diagram of a system including a device that supports techniques for continuous beam scanning for integrated lens antennas in accordance with one or more aspects of the present disclosure.

FIG. 12 shows a diagram of a system 1200 including a device 1205 that supports techniques for continuous beam scanning for integrated lens antennas in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for continuous beam scanning for integrated lens antennas). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving a set of synchronization signals via a set of multiple beams of a beam codebook. The communications manager 1220 may be configured as or otherwise support a means for transmitting a first measurement report including a first set of beam measurements corresponding to the set of multiple beams of the beam codebook based on the set of synchronization signals. The communications manager 1220 may be configured as or otherwise support a means for receiving a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The communications manager 1220 may be configured as or otherwise support a means for transmitting a second measurement report indicating a second set of beam measurements corresponding to the set of multiple beams and at least one beam measurement associated with the first serving beam. The communications manager 1220 may be configured as or otherwise support a means for communicating one or more messages via the first serving beam based on the at least one beam measurement associated with the first serving beam satisfying a threshold.

By including or configuring the communications manager 1220 in accordance with examples as described herein, the device 1205 may support techniques for improved communication reliability, reduced latency, improved user experience related to increased QoS and beam accuracy, more efficient utilization of communication resources, improved coordination between devices, increased link budget, increased beam steering accuracy, and increased receive power.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for continuous beam scanning for integrated lens antennas as described herein, or the processor 1240 and the memory 1230 may be otherwise configured to perform or support such operations.

Figure 13:
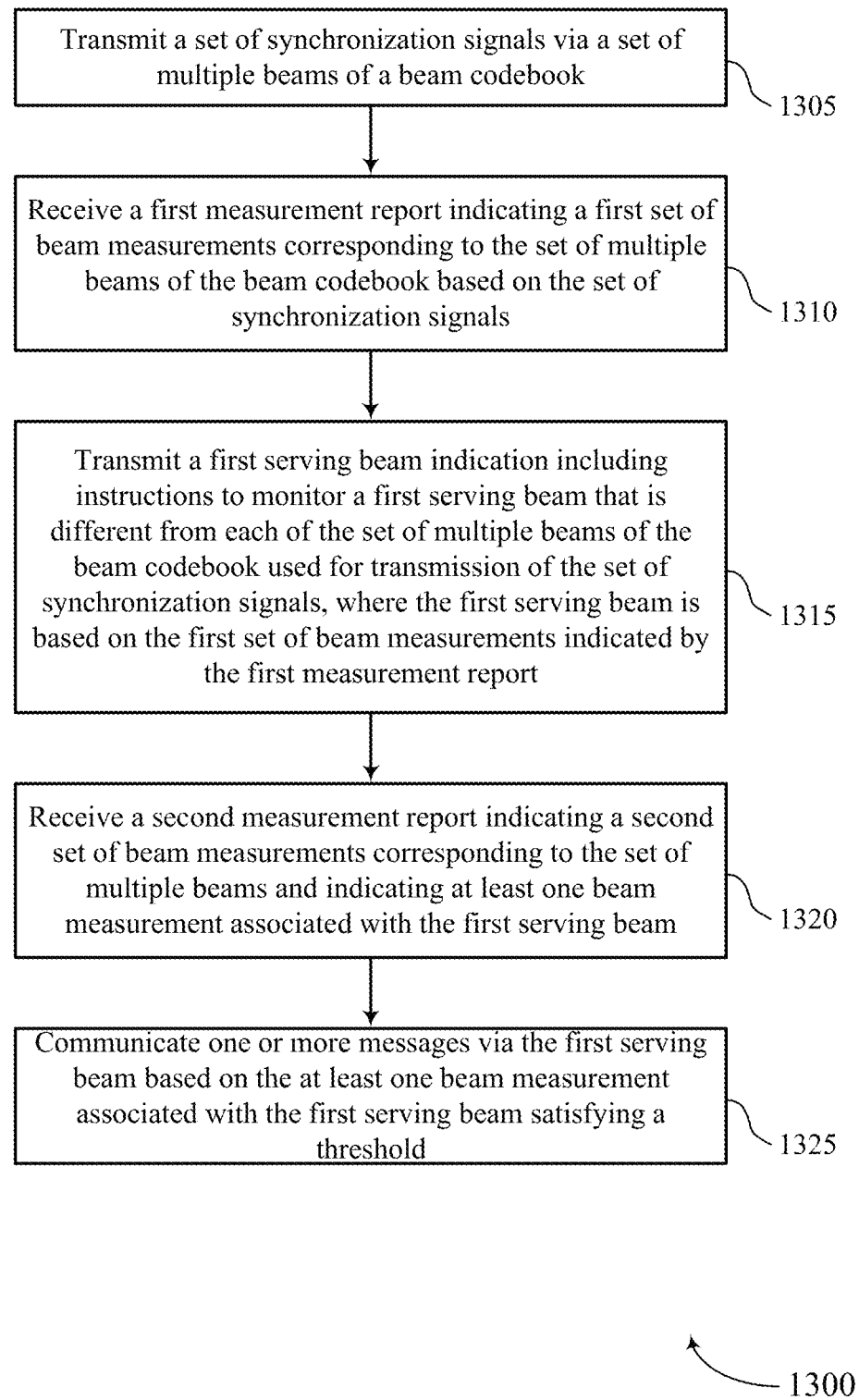
FIGS. 13 through 15 show flowcharts illustrating methods that support techniques for continuous beam scanning for integrated lens antennas in accordance with one or more aspects of the present disclosure.

FIG. 13 shows a flowchart illustrating a method 1300 that supports techniques for continuous beam scanning for integrated lens antennas in accordance with one or more aspects of the present disclosure. The operations of the method 1300 may be implemented by a network entity or its components as described herein. For example, the operations of the method 1300 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include transmitting a set of synchronization signals via a set of multiple beams of a beam codebook. The operations of 1305 may be performed in accordance with examples as disclosed herein. In some examples, aspects of the operations of 1305 may be performed by a beamforming component 725 as described with reference to FIG. 7.

At 1310, the method may include receiving a first measurement report indicating a first set of beam measurements corresponding to the set of multiple beams of the beam codebook based on the set of synchronization signals. The operations of 1310 may be performed in accordance with examples as disclosed herein. In some examples, aspects of the operations of 1310 may be performed by a measurement report analysis component 730 as described with reference to FIG. 7.

At 1315, the method may include transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The operations of 1315 may be performed in accordance with examples as disclosed herein. In some examples, aspects of the operations of 1315 may be performed by a beam monitoring indication component 735 as described with reference to FIG. 7.

At 1320, the method may include receiving a second measurement report indicating a second set of beam measurements corresponding to the set of multiple beams and indicating at least one beam measurement associated with the first serving beam. The operations of 1320 may be performed in accordance with examples as disclosed herein. In some examples, aspects of the operations of 1320 may be performed by a measurement report analysis component 730 as described with reference to FIG. 7.

At 1325, the method may include communicating one or more messages via the first serving beam based on the at least one beam measurement associated with the first serving beam satisfying a threshold. The operations of 1325 may be performed in accordance with examples as disclosed herein. In some examples, aspects of the operations of 1325 may be performed by a beamforming component 725 as described with reference to FIG. 7.

Figure 14:
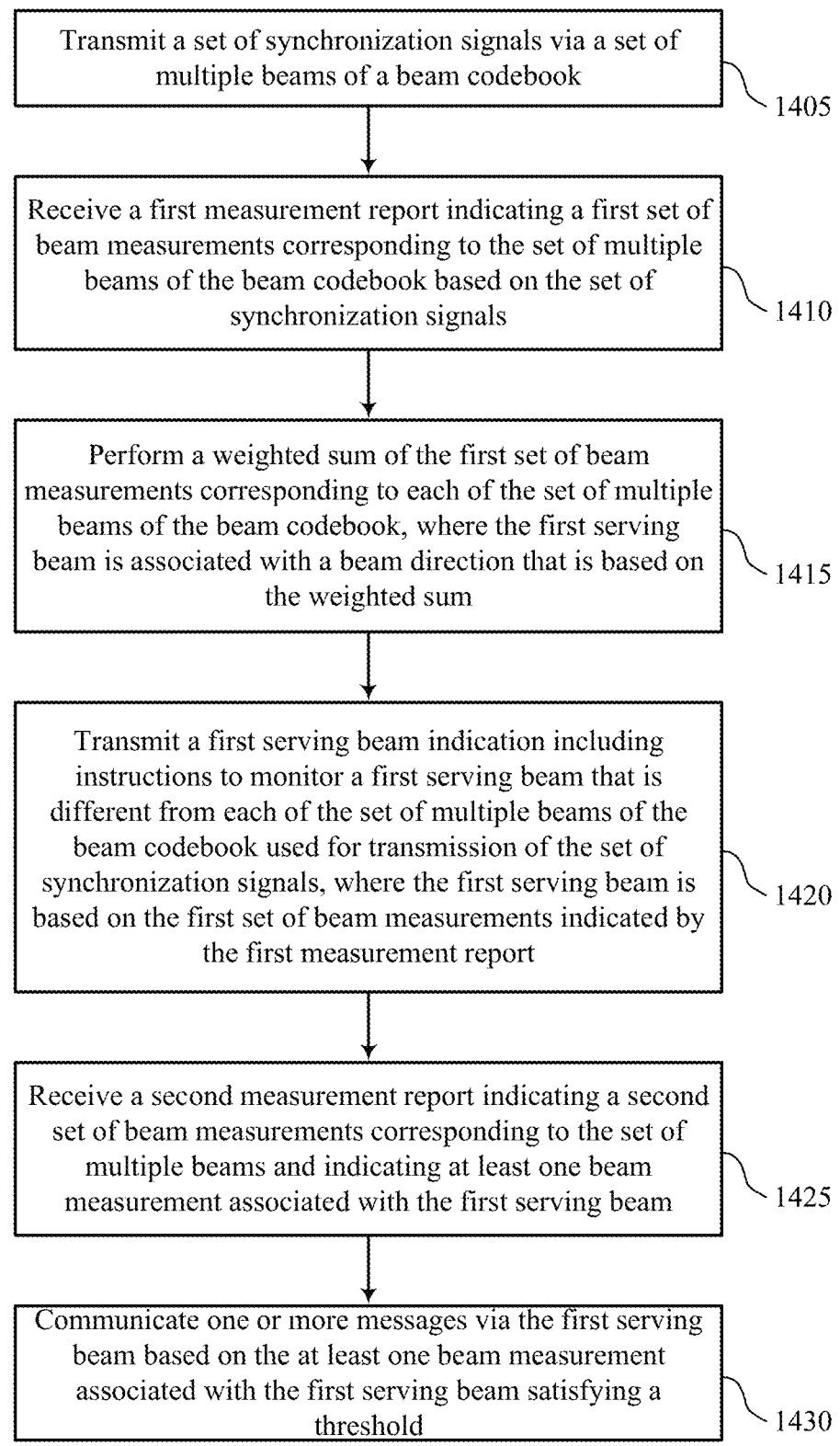

FIG. 14 shows a flowchart illustrating a method 1400 that supports techniques for continuous beam scanning for integrated lens antennas in accordance with one or more aspects of the present disclosure. The operations of the method 1400 may be implemented by a network entity or its components as described herein. For example, the operations of the method 1400 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1405, the method may include transmitting a set of synchronization signals via a set of multiple beams of a beam codebook. The operations of 1405 may be performed in accordance with examples as disclosed herein. In some examples, aspects of the operations of 1405 may be performed by a beamforming component 725 as described with reference to FIG. 7.

At 1410, the method may include receiving a first measurement report indicating a first set of beam measurements corresponding to the set of multiple beams of the beam codebook based on the set of synchronization signals. The operations of 1410 may be performed in accordance with examples as disclosed herein. In some examples, aspects of the operations of 1410 may be performed by a measurement report analysis component 730 as described with reference to FIG. 7.

At 1415, the method may include performing a weighted sum of the first set of beam measurements corresponding to each of the set of multiple beams of the beam codebook, where the first serving beam is associated with a beam direction that is based on the weighted sum. The operations of 1415 may be performed in accordance with examples as disclosed herein. In some examples, aspects of the operations of 1415 may be performed by a beam direction determination component 740 as described with reference to FIG. 7.

At 1420, the method may include transmitting a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The operations of 1420 may be performed in accordance with examples as disclosed herein. In some examples, aspects of the operations of 1420 may be performed by a beam monitoring indication component 735 as described with reference to FIG. 7.

At 1425, the method may include receiving a second measurement report indicating a second set of beam measurements corresponding to the set of multiple beams and indicating at least one beam measurement associated with the first serving beam. The operations of 1425 may be performed in accordance with examples as disclosed herein. In some examples, aspects of the operations of 1425 may be performed by a measurement report analysis component 730 as described with reference to FIG. 7.

At 1430, the method may include communicating one or more messages via the first serving beam based on the at least one beam measurement associated with the first serving beam satisfying a threshold. The operations of 1430 may be performed in accordance with examples as disclosed herein. In some examples, aspects of the operations of 1430 may be performed by a beamforming component 725 as described with reference to FIG. 7.

Figure 15:
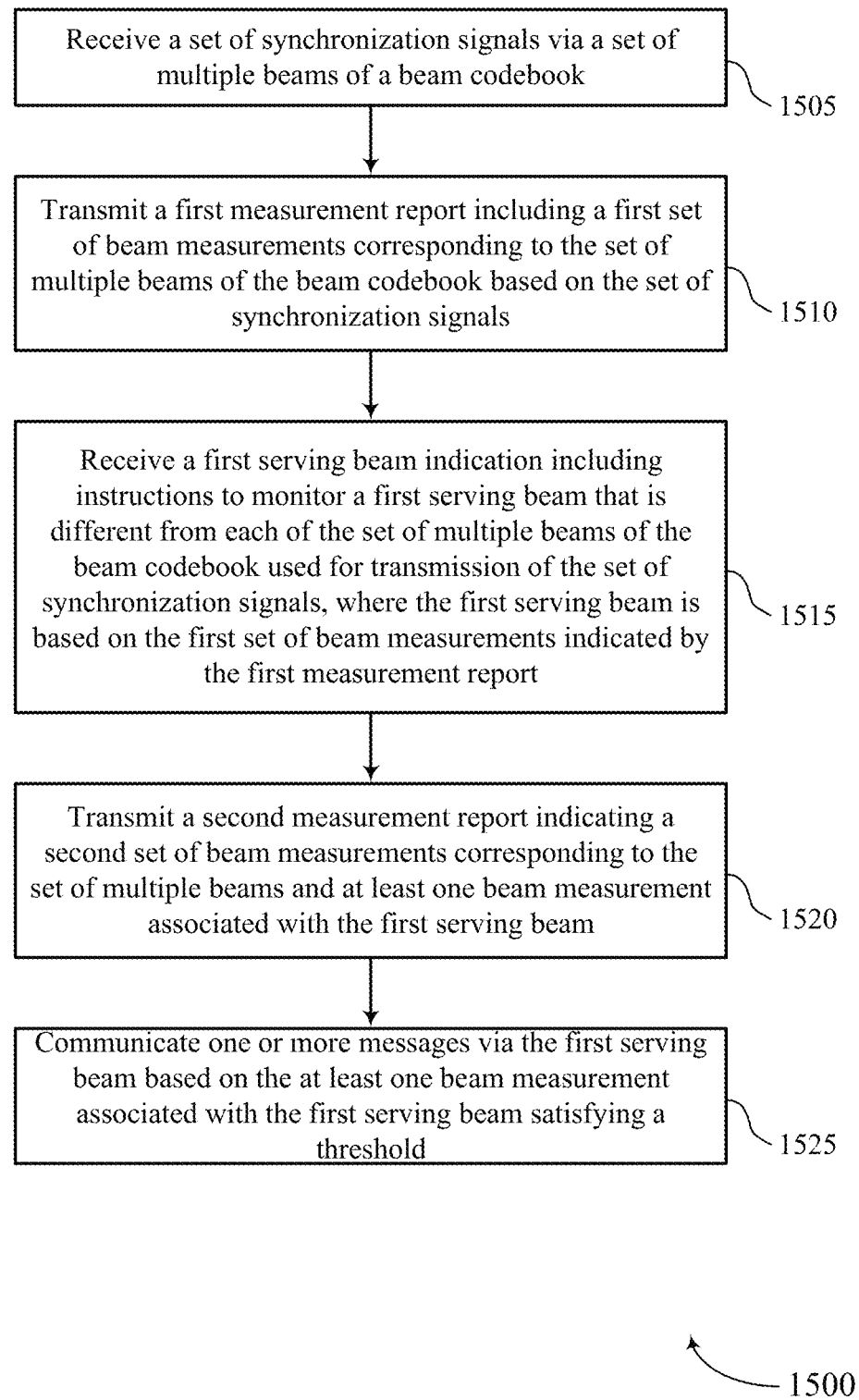

FIG. 15 shows a flowchart illustrating a method 1500 that supports techniques for continuous beam scanning for integrated lens antennas in accordance with one or more aspects of the present disclosure. The operations of the method 1500 may be implemented by a UE or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1505, the method may include receiving a set of synchronization signals via a set of multiple beams of a beam codebook. The operations of 1505 may be performed in accordance with examples as disclosed herein. In some examples, aspects of the operations of 1505 may be performed by an SSB measurement component 1125 as described with reference to FIG. 11.

At 1510, the method may include transmitting a first measurement report including a first set of beam measurements corresponding to the set of multiple beams of the beam codebook based on the set of synchronization signals. The operations of 1510 may be performed in accordance with examples as disclosed herein. In some examples, aspects of the operations of 1510 may be performed by a measurement reporting component 1130 as described with reference to FIG. 11.

At 1515, the method may include receiving a first serving beam indication including instructions to monitor a first serving beam that is different from each of the set of multiple beams of the beam codebook used for transmission of the set of synchronization signals, where the first serving beam is based on the first set of beam measurements indicated by the first measurement report. The operations of 1515 may be performed in accordance with examples as disclosed herein. In some examples, aspects of the operations of 1515 may be performed by a beam monitoring component 1135 as described with reference to FIG. 11.

At 1520, the method may include transmitting a second measurement report indicating a second set of beam measurements corresponding to the set of multiple beams and at least one beam measurement associated with the first serving beam. The operations of 1520 may be performed in accordance with examples as disclosed herein. In some examples, aspects of the operations of 1520 may be performed by a measurement reporting component 1130 as described with reference to FIG. 11.

At 1525, the method may include communicating one or more messages via the first serving beam based on the at least one beam measurement associated with the first serving beam satisfying a threshold. The operations of 1525 may be performed in accordance with examples as disclosed herein. In some examples, aspects of the operations of 1525 may be performed by a beamforming component 1140 as described with reference to FIG. 11.

The following provides an overview of aspects of the present disclosure:

Aspect 1: A method for wireless communication at a network entity, comprising: transmitting a set of synchronization signals via a plurality of beams of a beam codebook; receiving a first measurement report indicating a first set of beam measurements corresponding to the plurality of beams of the beam codebook based at least in part on the set of synchronization signals; transmitting a first serving beam indication comprising instructions to monitor a first serving beam that is different from each of the plurality of beams of the beam codebook used for transmission of the set of synchronization signals, wherein the first serving beam is based at least in part on the first set of beam measurements indicated by the first measurement report; receiving a second measurement report indicating a second set of beam measurements corresponding to the plurality of beams and indicating at least one beam measurement associated with the first serving beam; and communicating one or more messages via the first serving beam based at least in part on the at least one beam measurement associated with the first serving beam satisfying a threshold.

Aspect 2: The method of aspect 1, further comprising: performing a weighted sum of the first set of beam measurements corresponding to each of the plurality of beams of the beam codebook, wherein the first serving beam is associated with a beam direction that is based at least in part on the weighted sum.

Aspect 3: The method of any of aspects 1 through 2, further comprising: generating, based at least in part on the first set of beam measurements, a beam index associated with the first serving beam, the beam index different from a set of beam indices for the plurality of beams of the beam codebook; and transmitting an indication of the beam codebook including the beam index associated with the first serving beam.

Aspect 4: The method of any of aspects 1 through 3, wherein receiving the second measurement report indicating the second set of beam measurements comprises: receiving one or more respective received power measurements for each of the plurality of beams of the beam codebook and the first serving beam.

Aspect 5: The method of any of aspects 1 through 4, further comprising: generating, for the beam codebook, a beam index associated with a second serving beam based at least in part on removal of the first serving beam from the beam codebook; and transmitting a second serving beam indication comprising instructions to monitor the second serving beam that is different from each of the plurality of beams of the beam codebook and the first serving beam.

Aspect 6: The method of any of aspects 1 through 5, further comprising: generating the first serving beam by routing an input signal to at least two antenna elements of the network entity; and transmitting, using the at least two antenna elements, the first serving beam in a direction that is based at least in part on the first set of beam measurements of the first measurement report.

Aspect 7: The method of aspect 6, further comprising: splitting the input signal into two input signals having different respective input powers at each antenna element of the at least two antenna elements.

Aspect 8: The method of any of aspects 6 through 7, further comprising: applying one or more beam weights to each antenna element of the at least two antenna elements.

Aspect 9: The method of any of aspects 1 through 8, further comprising: generating the first serving beam based at least in part on one or more beam coefficients, an input signal at the network entity, a radiation pattern of each of the plurality of beams, an angle of one or more sidelobes associated with the radiation pattern, or any combination thereof.

Aspect 10: The method of any of aspects 1 through 9, further comprising: applying a selection algorithm to a plurality of beam weight coefficients included in the first set of beam measurements to determine a set of beam weight coefficients associated with the first serving beam; and transmitting the first serving beam according to a signal energy that is based at least in part on the set of beam weight coefficients.

Aspect 11: The method of aspect 10, wherein the selection algorithm comprises a gradient decent algorithm.

Aspect 12: The method of any of aspects 1 through 11, further comprising: determining a direction of the first serving beam based at least in part on a machine learning model, a parabolic interpolation of the first set of beam measurements, a high order interpolation of the first set of beam measurements, one or more optimization procedures, or any combination thereof.

Aspect 13: The method of any of aspects 1 through 12, wherein the threshold comprises a receive power threshold, a time duration threshold, a beam selection threshold, or any combination thereof.

Aspect 14: A method for wireless communication at a UE, comprising: receiving a set of synchronization signals via a plurality of beams of a beam codebook; transmitting a first measurement report comprising a first set of beam measurements corresponding to the plurality of beams of the beam codebook based at least in part on the set of synchronization signals; receiving a first serving beam indication comprising instructions to monitor a first serving beam that is different from each of the plurality of beams of the beam codebook used for transmission of the set of synchronization signals, wherein the first serving beam is based at least in part on the first set of beam measurements indicated by the first measurement report; transmitting a second measurement report indicating a second set of beam measurements corresponding to the plurality of beams and at least one beam measurement associated with the first serving beam; and communicating one or more messages via the first serving beam based at least in part on the at least one beam measurement associated with the first serving beam satisfying a threshold.

Aspect 15: The method of aspect 14, further comprising: receiving the first serving beam that is based at least in part on a weighted sum of the first set of beam measurements corresponding to each of the plurality of beams of the beam codebook.

Aspect 16: The method of any of aspects 14 through 15, wherein receiving the first serving beam indication further comprises: receiving an indication of the beam codebook including a beam index associated with the first serving beam based at least in part on the first set of beam measurements, the beam index different from a set of beam indices for the plurality of beams of the beam codebook.

Aspect 17: The method of any of aspects 14 through 16, wherein transmitting the second measurement report indicating the second set of beam measurements comprises: transmitting one or more respective received power measurements for each of the plurality of beams of the beam codebook and the first serving beam.

Aspect 18: The method of any of aspects 14 through 17, further comprising: receiving an indication of a beam index associated with a second serving beam that is different from the first serving beam based at least in part on the first serving beam failing to satisfy the threshold; and receiving a second serving beam indication comprising instructions to monitor the second serving beam that is different from each of the plurality of beams of the beam codebook and the first serving beam.

Aspect 19: The method of any of aspects 14 through 18, wherein the threshold comprises a receive power threshold, a time duration threshold, a beam selection threshold, or any combination thereof.

Aspect 20: An apparatus for wireless communication at a network entity, comprising a processor; memory coupled with the processor; and instructions stored in the memory and executable by the processor to cause the apparatus to perform a method of any of aspects 1 through 13.

Aspect 21: An apparatus for wireless communication at a network entity, comprising at least one means for performing a method of any of aspects 1 through 13.

Aspect 22: A non-transitory computer-readable medium storing code for wireless communication at a network entity, the code comprising instructions executable by a processor to perform a method of any of aspects 1 through 13.

Aspect 23: An apparatus for wireless communication at a UE, comprising a processor; memory coupled with the processor; and instructions stored in the memory and executable by the processor to cause the apparatus to perform a method of any of aspects 14 through 19.

Aspect 24: An apparatus for wireless communication at a UE, comprising at least one means for performing a method of any of aspects 14 through 19.

Aspect 25: A non-transitory computer-readable medium storing code for wireless communication at a UE, the code comprising instructions executable by a processor to perform a method of any of aspects 14 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As described herein, the term "set of elements" or similar phrasing may be understood as a "set of one or more elements."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a network entity, comprising:

a processor;

memory coupled with the processor; and one or more instructions stored in the memory and executable by the processor to cause the apparatus to, based at least in part on the one or more instructions:

transmit a set of synchronization signals via a plurality of beams of a beam codebook;

receive a first measurement report indicating a first set of beam measurements corresponding to the plurality of beams of the beam codebook based at least in part on the set of synchronization signals;

transmit a first serving beam indication comprising instructions to monitor a first serving beam that is different from each of the plurality of beams of the beam codebook used for transmission of the set of synchronization signals, wherein the first serving beam is based at least in part on the first set of beam measurements indicated by the first measurement report;

receive a second measurement report indicating a second set of beam measurements corresponding to the plurality of beams and indicating at least one beam measurement associated with the first serving beam; and communicate one or more messages via the first serving beam based at least in part on the at least one beam measurement associated with the first serving beam satisfying a threshold.

2. The apparatus of claim 1, wherein the one or more instructions are further executable by the processor to cause the apparatus to, based at least in part on the one or more instructions:
perform a weighted sum of the first set of beam measurements corresponding to each of the plurality of beams of the beam codebook, wherein the first serving beam is associated with a beam direction that is based at least in part on the weighted sum.

3. The apparatus of claim 1, wherein the one or more instructions are further executable by the processor to cause the apparatus to, based at least in part on the one or more instructions:
generate, based at least in part on the first set of beam measurements, a beam index associated with the first serving beam, the beam index different from a set of beam indices for the plurality of beams of the beam codebook; and
transmit an indication of the beam codebook including the beam index associated with the first serving beam.

4. The apparatus of claim 1, wherein the one or more instructions to receive the second measurement report indicating the second set of beam measurements are executable by the processor to cause the apparatus to, based at least in part on the one or more instructions:
receive one or more respective received power measurements for each of the plurality of beams of the beam codebook and the first serving beam.

5. The apparatus of claim 1, wherein the one or more instructions are further executable by the processor to cause the apparatus to, based at least in part on the one or more instructions:
generate, for the beam codebook, a beam index associated with a second serving beam based at least in part on removal of the first serving beam from the beam codebook; and
transmit a second serving beam indication comprising instructions to monitor the second serving beam that is different from each of the plurality of beams of the beam codebook and the first serving beam.

6. The apparatus of claim 1, wherein the one or more instructions are further executable by the processor to cause the apparatus to, based at least in part on the one or more instructions:
generate the first serving beam by routing an input signal to at least two antenna elements of the network entity; and
transmit, using the at least two antenna elements, the first serving beam in a direction that is based at least in part on the first set of beam measurements of the first measurement report.

7. The apparatus of claim 6, wherein the one or more instructions are further executable by the processor to cause the apparatus to, based at least in part on the one or more instructions:
split the input signal into two input signals having different respective input powers at each antenna element of the at least two antenna elements.

8. The apparatus of claim 6, wherein the one or more instructions are further executable by the processor to cause the apparatus to, based at least in part on the one or more instructions:
apply one or more beam weights to each antenna element of the at least two antenna elements.

9. The apparatus of claim 1, wherein the one or more instructions are further executable by the processor to cause the apparatus to, based at least in part on the one or more instructions:
generate the first serving beam based at least in part on one or more beam coefficients, an input signal at the network entity, a radiation pattern of each of the plurality of beams, an angle of one or more sidelobes associated with the radiation pattern, or any combination thereof.

10. The apparatus of claim 1, wherein the one or more instructions are further executable by the processor to cause the apparatus to, based at least in part on the one or more instructions:
apply a selection algorithm to a plurality of beam weight coefficients included in the first set of beam measurements to determine a set of beam weight coefficients associated with the first serving beam; and
transmit the first serving beam according to a signal energy that is based at least in part on the set of beam weight coefficients.

11. The apparatus of claim 10, wherein the selection algorithm comprises a gradient decent algorithm.

12. The apparatus of claim 1, wherein the instructions are further executable by the processor to cause the apparatus to:
apply a direction to the first serving beam based at least in part on a machine learning model, a parabolic interpolation of the first set of beam measurements, a high order interpolation of the first set of beam measurements, one or more optimization procedures, or any combination thereof.

13. The apparatus of claim 1, wherein the threshold comprises a receive power threshold, a time duration threshold, a beam selection threshold, or any combination thereof.

14. An apparatus for wireless communication at a user equipment (UE), comprising:
a processor;
memory coupled with the processor; and
one or more instructions stored in the memory and executable by the processor to cause the apparatus to, based at least in part on the one or more instructions:
receive a set of synchronization signals via a plurality of beams of a beam codebook;
transmit a first measurement report comprising a first set of beam measurements corresponding to the plurality of beams of the beam codebook based at least in part on the set of synchronization signals;
receive a first serving beam indication comprising instructions to monitor a first serving beam that is different from each of the plurality of beams of the beam codebook used for transmission of the set of synchronization signals, wherein the first serving beam is based at least in part on the first set of beam measurements indicated by the first measurement report;
transmit a second measurement report indicating a second set of beam measurements corresponding to the plurality of beams and at least one beam measurement associated with the first serving beam; and
communicate one or more messages via the first serving beam based at least in part on the at least one beam measurement associated with the first serving beam satisfying a threshold.

15. The apparatus of claim 14, wherein the one or more instructions are further executable by the processor to cause the apparatus to, based at least in part on the one or more instructions:

receive the first serving beam that is based at least in part on a weighted sum of the first set of beam measurements corresponding to each of the plurality of beams of the beam codebook.

16. The apparatus of claim 14, wherein the one or more instructions to receive the first serving beam indication are further executable by the processor to cause the apparatus to, based at least in part on the one or more instructions:
receive an indication of the beam codebook including a beam index associated with the first serving beam based at least in part on the first set of beam measurements, the beam index different from a set of beam indices for the plurality of beams of the beam codebook.

17. The apparatus of claim 14, wherein the one or more instructions to transmit the second measurement report indicating the second set of beam measurements are executable by the processor to cause the apparatus to, based at least in part on the one or more instructions:
transmit one or more respective received power measurements for each of the plurality of beams of the beam codebook and the first serving beam.

18. The apparatus of claim 14, wherein the one or more instructions are further executable by the processor to cause the apparatus to, based at least in part on the one or more instructions:
receive an indication of a beam index associated with a second serving beam that is different from the first serving beam based at least in part on the first serving beam failing to satisfy the threshold; and
receive a second serving beam indication comprising instructions to monitor the second serving beam that is different from each of the plurality of beams of the beam codebook and the first serving beam.

19. The apparatus of claim 14, wherein the threshold comprises a receive power threshold, a time duration threshold, a beam selection threshold, or any combination thereof.

20. A method for wireless communication at a network entity, comprising:
transmitting a set of synchronization signals via a plurality of beams of a beam codebook;
receiving a first measurement report indicating a first set of beam measurements corresponding to the plurality of beams of the beam codebook based at least in part on the set of synchronization signals;
transmitting a first serving beam indication comprising instructions to monitor a first serving beam that is different from each of the plurality of beams of the beam codebook used for transmission of the set of synchronization signals, wherein the first serving beam is based at least in part on the first set of beam measurements indicated by the first measurement report;
receiving a second measurement report indicating a second set of beam measurements corresponding to the plurality of beams and indicating at least one beam measurement associated with the first serving beam; and
communicating one or more messages via the first serving beam based at least in part on the at least one beam measurement associated with the first serving beam satisfying a threshold.

21. The method of claim 20, further comprising:
performing a weighted sum of the first set of beam measurements corresponding to each of the plurality of beams of the beam codebook, wherein the first serving beam is associated with a beam direction that is based at least in part on the weighted sum.

22. The method of claim 20, further comprising:
generating, based at least in part on the first set of beam measurements, a beam index associated with the first serving beam, the beam index different from a set of beam indices for the plurality of beams of the beam codebook; and
transmitting an indication of the beam codebook including the beam index associated with the first serving beam.

23. The method of claim 20, wherein receiving the second measurement report indicating the second set of beam measurements comprises:
receiving one or more respective received power measurements for each of the plurality of beams of the beam codebook and the first serving beam.

24. The method of claim 20, further comprising:
generating, for the beam codebook, a beam index associated with a second serving beam based at least in part on removal of the first serving beam from the beam codebook; and
transmitting a second serving beam indication comprising instructions to monitor the second serving beam that is different from each of the plurality of beams of the beam codebook and the first serving beam.

25. The method of claim 20, further comprising:
generating the first serving beam by routing an input signal to at least two antenna elements of the network entity; and
transmitting, using the at least two antenna elements, the first serving beam in a direction that is based at least in part on the first set of beam measurements of the first measurement report.

26. The method of claim 25, further comprising:
splitting the input signal into two input signals having different respective input powers at each antenna element of the at least two antenna elements.

27. The method of claim 25, further comprising:
applying one or more beam weights to each antenna element of the at least two antenna elements.

28. The method of claim 20, further comprising:
generating the first serving beam based at least in part on one or more beam coefficients, an input signal at the network entity, a radiation pattern of each of the plurality of beams, an angle of one or more sidelobes associated with the radiation pattern, or any combination thereof.

29. The method of claim 20, further comprising:
applying a selection algorithm to a plurality of beam weight coefficients included in the first set of beam measurements to determine a set of beam weight coefficients associated with the first serving beam; and
transmitting the first serving beam according to a signal energy that is based at least in part on the set of beam weight coefficients.

30. A method for wireless communication at a user equipment (UE), comprising:
receiving a set of synchronization signals via a plurality of beams of a beam codebook;
transmitting a first measurement report comprising a first set of beam measurements corresponding to the plurality of beams of the beam codebook based at least in part on the set of synchronization signals;
receiving a first serving beam indication comprising instructions to monitor a first serving beam that is different from each of the plurality of beams of the beam codebook used for transmission of the set of synchronization signals, wherein the first serving beam is based at least in part on the first set of beam measurements indicated by the first measurement report;

transmitting a second measurement report indicating a second set of beam measurements corresponding to the plurality of beams and at least one beam measurement associated with the first serving beam; and communicating one or more messages via the first serving beam based at least in part on the at least one beam measurement associated with the first serving beam satisfying a threshold.

* * * * *